(12) United States Patent
Levinshtein et al.

(10) Patent No.: US 10,380,763 B2
(45) Date of Patent: Aug. 13, 2019

(54) HYBRID CORNER AND EDGE-BASED TRACKING

(71) Applicant: SEIKO EPSON CORPORATION, Tokyo (JP)

(72) Inventors: Alex Levinshtein, Vaughan (CA); Qadeer Baig, Ajax (CA); Andrei Mark Rotenstein, Vaughan (CA); Yan Zhao, Markham (CA)

(73) Assignee: SEIKO EPSON CORPORATION, Tokyo (JP)

( * ) Notice: Subject to any disclaimer, the term of this patent is extended or adjusted under 35 U.S.C. 154(b) by 86 days.

(21) Appl. No.: 15/814,924

(22) Filed: Nov. 16, 2017

(65) Prior Publication Data

US 2018/0137651 A1 May 17, 2018

Related U.S. Application Data

(60) Provisional application No. 62/422,981, filed on Nov. 16, 2016, provisional application No. 62/422,996, filed on Nov. 16, 2016.

(51) Int. Cl.

| | |
|---|---|
| *G06K 9/62* | (2006.01) |
| *G06T 7/73* | (2017.01) |
| *G06T 9/20* | (2006.01) |
| *G02B 27/01* | (2006.01) |
| *G06T 7/13* | (2017.01) |
| *G06T 19/00* | (2011.01) |

(Continued)

(52) U.S. Cl.
CPC ............ *G06T 7/75* (2017.01); *G02B 27/0172* (2013.01); *G06T 1/0007* (2013.01); *G06T 7/13* (2017.01); *G06T 7/136* (2017.01); *G06T 7/32* (2017.01); *G06T 9/20* (2013.01); *G06T 19/006* (2013.01); *G02B 2027/0178* (2013.01); *G02B 2027/0198* (2013.01); *G06T 2207/20* (2013.01)

(58) Field of Classification Search
CPC .... G06T 7/75; G06T 9/20; G06T 7/13; G06T 19/006; G06T 7/136; G06T 1/0007; G06T 7/32; G02B 27/0172
See application file for complete search history.

(56) References Cited

U.S. PATENT DOCUMENTS

| | | | |
|---|---|---|---|
| 8,467,576 B2 * | 6/2013 | Woo | G06T 7/251 |
| | | | 382/103 |
| 2010/0232727 A1 * | 9/2010 | Engedal | H04N 13/204 |
| | | | 382/285 |

(Continued)

*Primary Examiner* — Gregory M Desire
(74) *Attorney, Agent, or Firm* — Oliff PLC

(57) ABSTRACT

A method includes acquiring, from a camera, an image frame including a representation of an object, and retrieving from a memory, data containing a template of a first pose of the object. A processor compares the first template to the image frame. A plurality of candidate locations in the image frame having a correlation with the template exceeding a predetermined threshold is determined. Edge registration on at least one candidate location of the plurality of candidate locations is performed to derive a refined pose of the object. Based at least in part on the performed edge registration, an initial pose of the object is determined, and a display image is output for display on a display device. The position at which the display image is displayed and/or the content of the display image is based at least in part on the determined initial pose of the object.

20 Claims, 16 Drawing Sheets

(51) Int. Cl.
*G06T 7/136* (2017.01)
*G06T 1/00* (2006.01)
*G06T 7/32* (2017.01)

(56) References Cited

U.S. PATENT DOCUMENTS

| | | | |
|---|---|---|---|
| 2015/0029222 A1* | 1/2015 | Hofmann | G06K 9/00993 345/633 |
| 2016/0026253 A1* | 1/2016 | Bradski | G02B 27/225 345/8 |
| 2018/0137651 A1* | 5/2018 | Levinshtein | G06T 7/75 |
| 2018/0211399 A1* | 7/2018 | Lee | G06T 7/529 |

* cited by examiner

HYBRID CORNER AND EDGE-BASED TRACKING

CROSS-REFERENCE TO RELATED APPLICATIONS

This application claims the benefit of U.S. Provisional Application No. 62/422,981, filed on Nov. 16, 2016, and U.S. Provisional Application No. 62/422,996, filed on Nov. 16, 2016, the entire disclosures of which are hereby incorporated by reference in their entireties.

BACKGROUND

1. Technical Field

The disclosure relates generally to the field of object detection and tracking in image data streams, and more specifically to augmented reality system including hybrid object detection and tracking in image data streams.

2. Related Art

Augmented Reality (AR) has become increasingly common with the advancement of computer technology. A general definition of AR is capturing a real-world scene and adding artificial (virtual) elements using software. This can enhance a user's perception of the real world or provide entertainment to the user.

Object tracking is important in many AR implementations. This means that a real-world object is "followed" by an artificial object, such as computer-graphics enhancements or an information bubble (as perceived by the user). In other words, if the real-world object moves or the user's view moves relative to the real-world object, the artificial object will remain in the same location relative to the real-world object and/or the content of the artificial object will be determined based on the movement and/or new location of the real-world object. Location tracking is also important in many AR implementations. This means that a virtual object will stay in one location in the scene, regardless of the movement of the user.

One platform for implementing AR is the smartphone. The presence of a camera, display device, and processor on the same device allows for software to easily add artificial elements to a live scene captured by the camera. Moreover, the presence of motion sensors and locators (e.g. accelerometers and GPS) on these devices is exploited by the software to better implement AR.

Although smartphones provide a simple and convenient platform for implementing AR, they do not provide a very immersive experience for the user. This is because the user's eyes are spatially separated from the smartphone, and instead of perceiving the environment with their own eyes, they are viewing the scene as captured by the camera.

To improve on the AR experience, the transparent head-mounted display (HMD) can implement AR. These systems are usually glasses with prisms placed in front of the eyes. The user views the scene directly through the glasses. The prisms allow for artificial images to be overlaid on the scene as perceived by the user. Meanwhile, the HMD collects data from the scene using a camera.

3D pose estimation is an important technology with many applications, including the fields of AR, VR and robotics. In AR and VR, the problem is that of tracking the 3D pose of the object with respect to the camera so that various augmented or virtual reality elements can be anchored to the object. Many trackers require an initialization method to first start tracking and to re-start tracking in case of tracking loss. This requires estimating the pose of an object from an image without prior history, a technology sometimes referred to as object detection and pose estimation (ODPE).

SUMMARY

For rich feature objects, a common approach is to establish sparse point correspondences between features on a 3D model and features in the image and solve the Perspective-n-Point (PnP) problem. These correspondences are typically established by detecting stable keypoints and matching them using distinctive appearance-based descriptors, such as Oriented FAST and Rotated BRIEF (ORB) descriptors.

However, for low feature objects, e.g., objects without many or distinct features, detecting stable keypoints and computing distinctive appearance based descriptors is challenging.

Embodiments of the present application disclose systems with a camera, a display device, and a processor. The example embodiments may increase accuracy of object detection and tracking in image data streams captured by the camera and may improve accuracy of displayable items on the display.

An advantage of some aspects of the disclosure is to solve at least a part of the problems described above, and aspects of the disclosure can be implemented as the following aspects.

One aspect of the disclosure is a non-transitory computer readable medium that embodies instructions that cause one or more processors to perform a method. The method includes acquiring, from a camera, an image frame representing an object in a real scene, and detecting, from the image frame, image first features using a first feature detection algorithm. Data containing (a) a preceding pose of the object, (b) preceding image first features detected in a preceding image frame prior to the image frame and corresponding to the preceding pose of the object, and (c) first 3D points corresponding to the preceding image first features is retrieved from one or more memories. The image first features and the preceding image first features are matched to establish first correspondences between the image first features and the first 3D points, and a candidate pose of the object corresponding to the image frame is derived based on the preceding pose of the object and the first correspondences. The method further includes deriving (a) candidate pose second features using the candidate pose and (b) second 3D points corresponding to the candidate pose second features. Image second features are detected, from the image frame, using a second feature detection algorithm, and the image second features and the candidate pose second features are matched to establish second correspondences between the image second features and the second 3D points. A pose of the object in the image frame is derived based on (a) the candidate pose, (b) the first correspondences, and (c) the second correspondences.

Another aspect of the present disclosure is a method of detecting an initial pose of an object in an image frame. The method includes acquiring, from a camera, an image frame representing an object in a real scene, and detecting, from the image frame, image first features using a first feature detection algorithm. Data containing (a) a preceding pose of the object, (b) preceding image first features detected in a preceding image frame prior to the image frame and corresponding to the preceding pose of the object, and (c) first 3D points corresponding to the preceding image first features is retrieved from one or more memories. The image first features and the preceding image first features are matched to establish first correspondences between the image first features and the first 3D points, and a candidate pose of the object corresponding to the image frame is derived based on the preceding pose of the object and the first correspondences. The method further includes deriving (a) candidate pose second features using the candidate pose and (b) second 3D points corresponding to the candidate pose second features. Image second features are detected, from the image frame, using a second feature detection algorithm, and the image second features and the candidate pose second features are matched to establish second correspondences between the image second features and the second 3D points. A pose of the object in the image frame is derived based on (a) the candidate pose, (b) the first correspondences, and (c) the second correspondences.

According to another aspect of this disclosure, a head-mounted display device includes a camera, one or more memories, a display device, and a processor. The processor is configured by instructions stored in the one or more memories to perform a method. The method includes acquiring, from a camera, an image frame representing an object in a real scene, and detecting, from the image frame, image first features using a first feature detection algorithm. Data containing (a) a preceding pose of the object, (b) preceding image first features detected in a preceding image frame prior to the image frame and corresponding to the preceding pose of the object, and (c) first 3D points corresponding to the preceding image first features is retrieved from the one or more memories. The image first features and the preceding image first features are matched to establish first correspondences between the image first features and the first 3D points, and a candidate pose of the object corresponding to the image frame is derived based on the preceding pose of the object and the first correspondences. The method further includes deriving (a) candidate pose second features using the candidate pose and (b) second 3D points corresponding to the candidate pose second features. Image second features are detected, from the image frame, using a second feature detection algorithm, and the image second features and the candidate pose second features are matched to establish second correspondences between the image second features and the second 3D points. A pose of the object in the image frame is derived based on (a) the candidate pose, (b) the first correspondences, and (c) the second correspondences.

BRIEF DESCRIPTION OF THE DRAWINGS

The disclosure will be described with reference to the accompanying drawings, wherein like numbers reference like elements.

DESCRIPTION OF EXEMPLARY EMBODIMENTS

Figure 1:
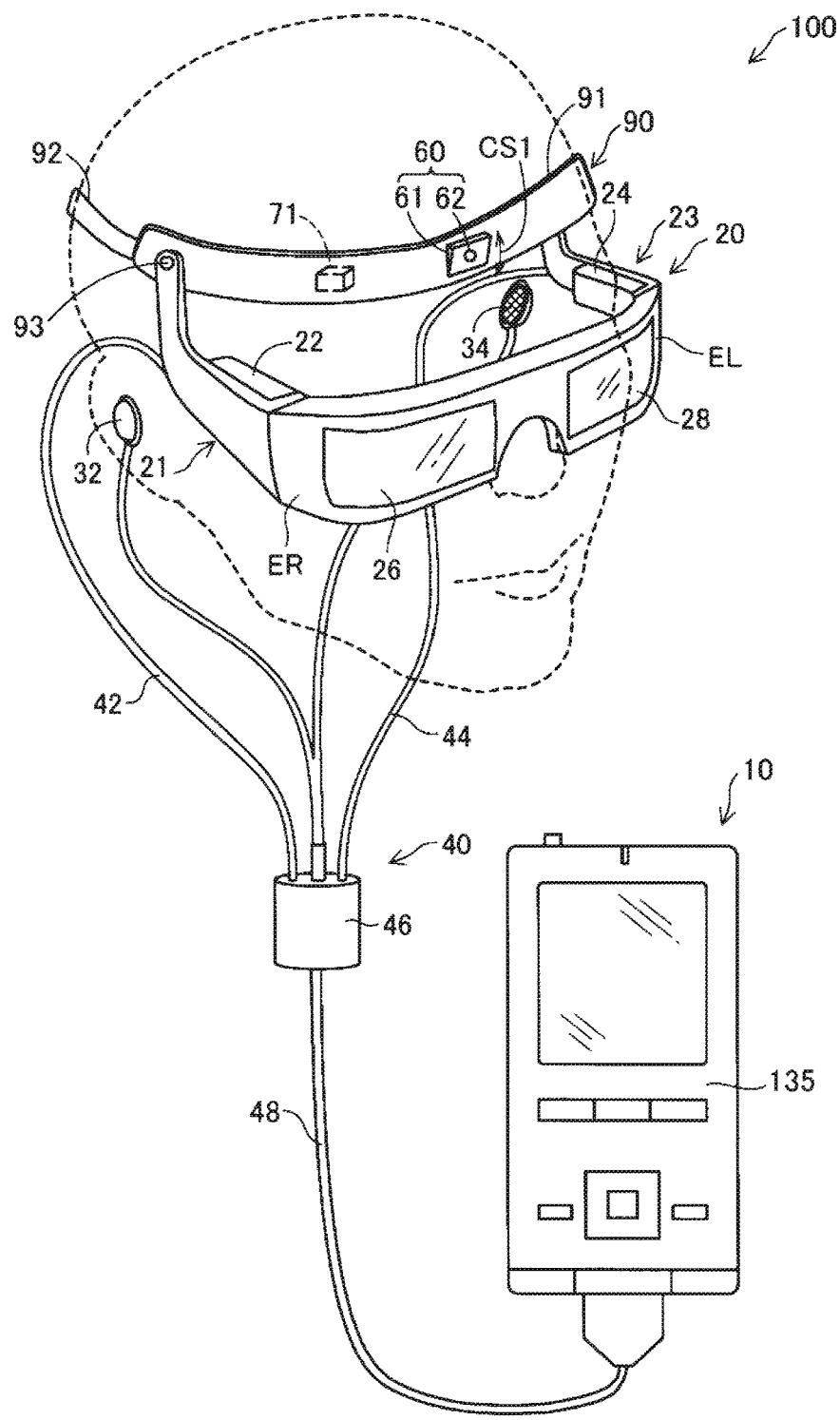
FIG. 1 is a diagram illustrating a schematic configuration of an example HMD.

FIG. 1 shows a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person. The belt 92 is worn around the head of the user.

The camera 60 functions as an imager. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base 61 that rotates with respect to the wearing base section 91 and a lens 62, a relative position of which is fixed with respect to the camera base 61. The camera base 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens 62, which is the optical axis of the camera 60, can be changed in the range of the arrow CS1. The lens 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holder 21, a right display driver 22, a left holder 23, a left display driver 24, a right optical-image display 26, and a left optical-image display 28.

The right optical-image display 26 and the left optical-image display 28 are located in front of the right eye and the left eye of the user when the user wears the display section 20. One end of the right optical-image display 26 and one end of the left optical-image display 28 are connected to each other in a position corresponding to the middle of the forehead of the user when the user wears the display section 20.

The right holder 21 has a shape extending in a substantial horizontal direction from an end portion ER, which is the other end of the right optical-image display 26, and inclining obliquely upward halfway. The right holder 21 connects the end portion ER and a coupling section 93 on the right side of the wearing base section 91.

Similarly, the left holder 23 has a shape extending in a substantial horizontal direction from an end portion EL, which is the other end of the left optical-image display 28 and inclining obliquely upward halfway. The left holder 23 connects the end portion EL and a coupling section (not shown in the figure) on the left side of the wearing base section 91.

The right holder 21 and the left holder 23 are coupled to the wearing base section 91 by left and right coupling sections 93 to locate the right optical-image display 26 and the left optical-image display 28 in front of the eyes of the user. Note that the coupling sections 93 couple the right holder 21 and the left holder 23 to be capable of rotating and capable of being fixed in any rotating positions. As a result, the display section 20 is provided to be capable of rotating with respect to the wearing base section 91.

The right holder 21 is a member provided to extend from the end portion ER, which is the other end of the right optical-image display 26, to a position corresponding to the temporal region of the user when the user wears the display section 20.

Similarly, the left holder 23 is a member provided to extend from the end portion EL, which is the other end of the left optical-image display 28 to a position corresponding to the temporal region of the user when the user wears the display section 20. The right display driver 22 and the left display driver 24 are disposed on a side opposed to the head of the user when the user wears the display section 20.

The display drivers 22 and 24 include liquid crystal displays 241 and 242 (hereinafter referred to as "LCDs 241 and 242" as well) and projection optical systems 251 and 252 explained below. The configuration of the display drivers 22 and 24 is explained in detail below.

The optical-image displays 26 and 28 include light guide plates 261 and 262 and dimming plates explained below. The light guide plates 261 and 262 are formed of a light transmissive resin material or the like and guide image lights output from the display drivers 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
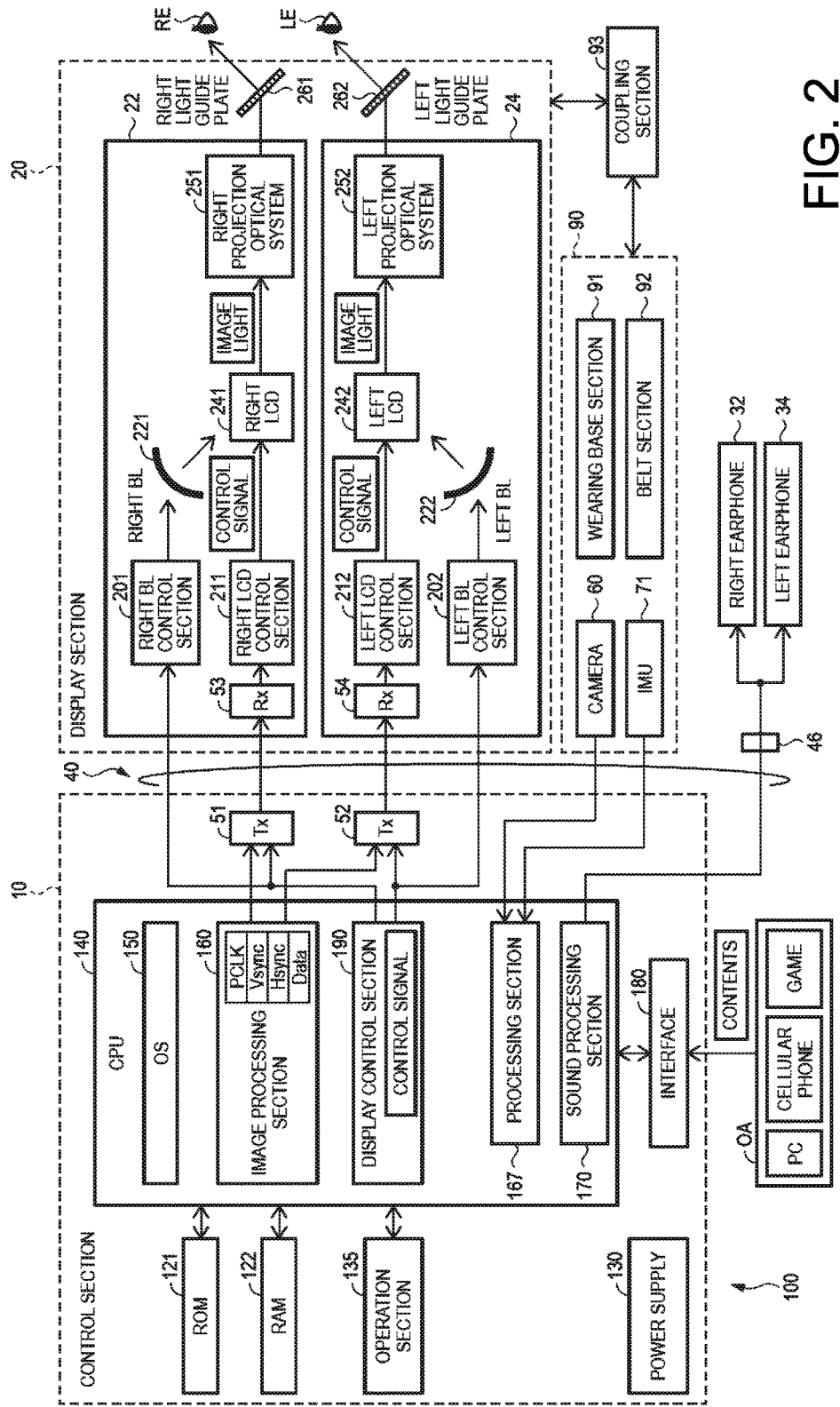
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitter (Tx 51) and a transmitter 52 (Tx 52).

The power supply 130 supplies electric power to the sections of the HMD 100. Various computer programs are stored in the ROM 121. The CPU 140 develops, in the RAM 122, the computer programs stored in the ROM 121 to execute the computer programs. The computer programs include computer programs for realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driver 22 and the left display driver 24. The display control section 190 controls generation and emission of image lights respectively by the right display driver 22 and the left display driver 24.

The display control section 190 transmits control signals to a right LCD control section 211 and a left LCD control section 212 respectively via the transmitters 51 and 52. The display control section 190 transmits control signals respectively to a right backlight control section 201 and a left backlight control section 202.

The image processing section 160 acquires an image signal included in contents and transmits the acquired image signal to receivers 53 and 54 of the display section 20 via the transmitters 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a homography matrix. The pose of the object means a spatial relation (a rotational relation) between the camera 60 and the object. The processing section 167 calculates, using the calculated spatial relation and detection values of acceleration and the like detected by the IMU 71, a rotation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driver 22, the left display driver 24, the right light guide plate 261 functioning as the right optical-image display 26, and the left light guide plate 262 functioning as the left optical-image display 28. The right and left light guide plates 261 and 262 are optical see-through elements that transmit light from real scene.

The right display driver 22 includes the receiver 53 (Rx 53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driver 22 may include a self-emitting display element such as an organic EL display element or may include a scan-type display element that scans a light beam from a laser diode on a retina. The same applies to the left display driver 24.

The receiver 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display 26 guides the image light output from the right projection optical system 251 to the right eye RE of the user while reflecting the image light along a predetermined optical path. Note that the left display driver 24 has a configuration same as the configuration of the right display driver 22 and corresponds to the left eye LE of the user. Therefore, explanation of the left display driver 24 is omitted.

The device to which the technology disclosed as an embodiment is applied may be an imaging device other than an HMD. For example, the device may be an imaging device that has no function of displaying an image.

Figure 3:
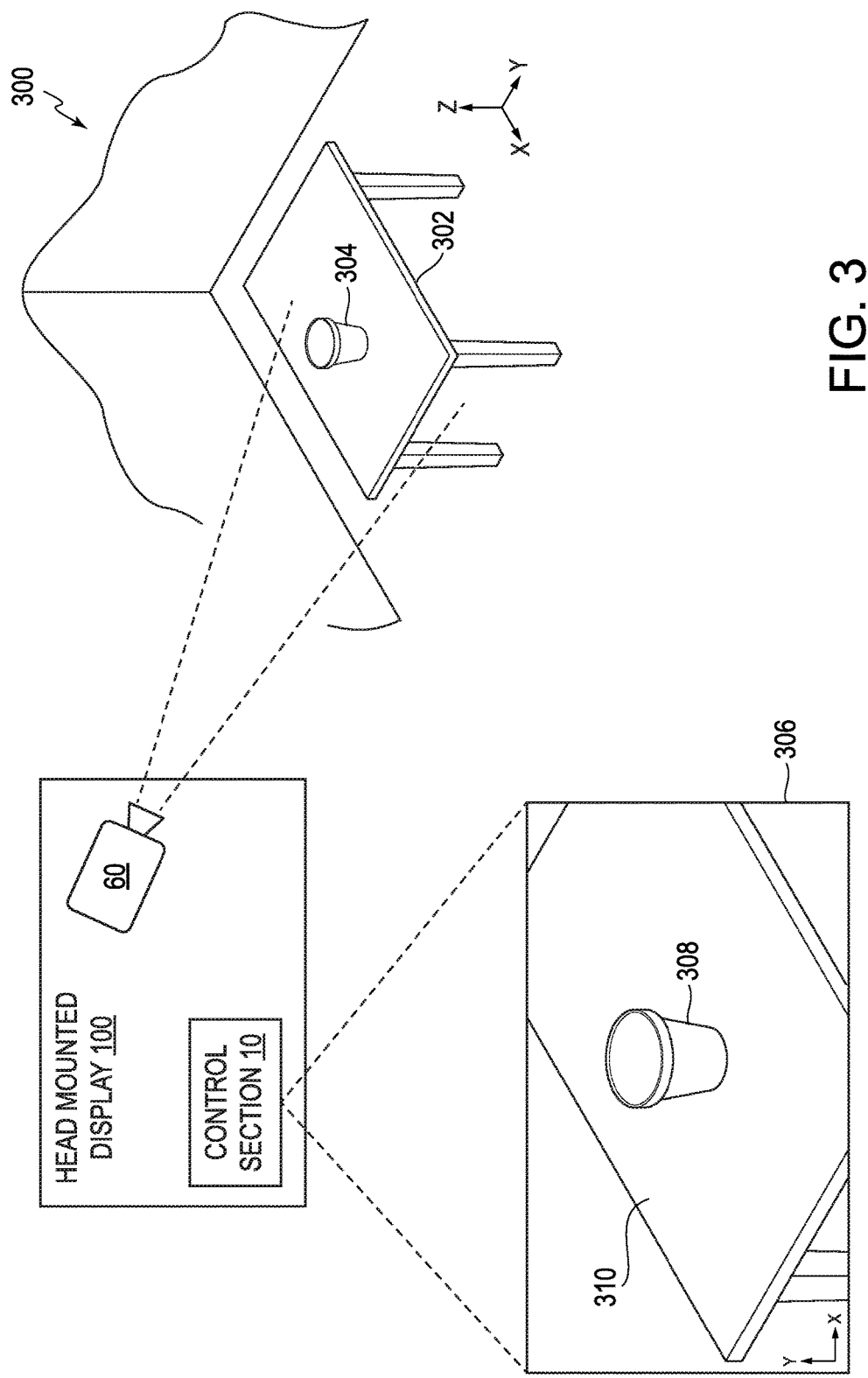
FIG. 3 is a diagram illustrating use of the HMD shown in FIGS. 1 and 2 in a three dimensional (3D) real-world scene.

FIG. 3 is a diagram illustrating use of the HMD 100 in a three dimensional (3D) real-world scene 300. Scene 300 includes a table 302 and an object 304 on the table 302. A user (not shown) wearing HMD 100 is positioned to view the scene 300. The camera 60 of the HMD 100 also views the scene 300 from approximately the same viewpoint as the user. The camera 60 captures images of the scene 300 from the viewpoint and provides an image data stream to the control section 10. The image data stream includes multiple temporally separate two dimensional (2D) image frames. FIG. 3 includes an example image frame 306, sometimes referred to as an image, received by the control section 10. The image frame 306 includes a representation 308 of the object 304 as viewed from the camera's viewpoint and a representation 310 of a portion of the table 302. A representation of an object, such as the representation 308 of object 304, in an image frame is sometimes also referred to herein as the object in the image frame.

As will be explained in more detail herein, the control section 10 initially attempts to locate the representation 310 of the object 304 in the image frame 306 and determine its pose. The control section 10 then attempts to track the representation 310 of the object 304 and update the pose of the object through subsequent image frames.

For initial detection of rich feature objects, some known systems establish sparse point correspondences between features on a 3D model of the object and features in the image and solve the PnP problem based on the established correspondences. These correspondences are typically established by detecting stable keypoints and matching them using distinctive appearance-based descriptors, such as ORB descriptors. However, for low feature objects detecting stable keypoints and computing distinctive appearance based descriptors may be challenging.

Accordingly, some embodiments of the present disclosure take a different approach to detection at the expense of providing a more constrained method for initialization. Generally, and as described in more detail below, the approach, performed by the control section 10, is based on 2D template matching followed by edge-based registration.

In an example embodiment, the method performed by the control section 10 includes two stages: template matching and edge-based registration. In the first stage, normalized cross correlation is used to match a template of the object that was learned offline to the image frame. In the example embodiment, only a single template is used and it is matched only at the original training scale. In other embodiments, multiple templates at one or multiple scales are used. To make the method more robust to scale and view variation, as well as for speed considerations, template matching is performed at a very low resolution (for example, 80×60).

The top K candidate locations from template matching after non-maxima suppression that meet or exceed a predetermined threshold are passed for edge-based registration. The value of K, and accordingly the number of candidate locations, may be predetermined, variable, or user selectable. Generally, it is desirable for K to be as small as possible to reduce the number of candidate locations that need to be subjected to edge-based registration, while being large enough to ensure that the actual location of the object in the image is detected. The uniqueness of the object, the clarity of the image frame, the amount of other items in the image frame, and the similarity of other items in the image frame to the object, are examples of factors that may affect how large or small K should be to facilitate detection.

Figure 4:
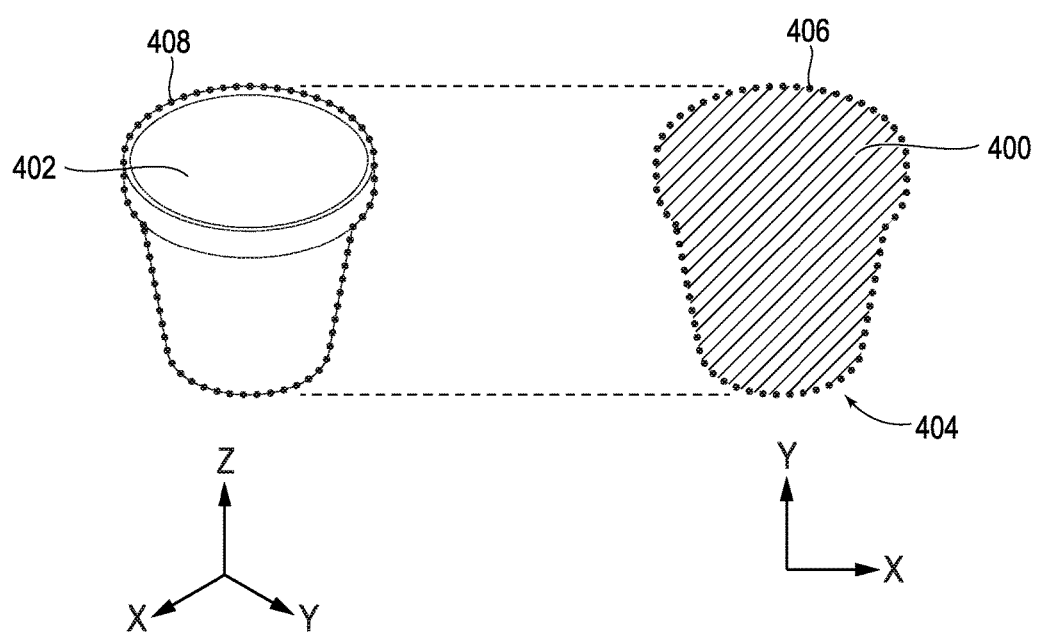
FIG. 4 is a 3D model and a template created from a 2D projection of the 3D model.

The template used for template matching is developed during training of the HMD 100. A 2D image frame of the object to be detected with the corresponding pose is captured, such as by the camera 60. A 3D CAD model of the object is manually aligned to match the pose and position of the object in the image frame by changing views (rotations and translations) with respect to the imaginary camera frame of reference. When capturing the 2D image frame for this alignment, it is preferable that the relative pose between the camera 60 and the object is close to one at which actual object detection takes place in some embodiments. With reference to FIG. 4, a 2D projection 400 of the aligned 3D CAD model 402 is created and the template 404 is taken as a tight bounding box around the projection of the CAD model 402. Each template 404 includes a plurality of 2D contour points 406 (sometimes referred to as model contour points) that represent a 2D contour (formed by connecting the 2D contour points) of the object in the training pose of that template. Contour tracing is performed using the algorithm of Suzuki and Abe, "Topological Structural Analysis of Digitized Binary Images by Border Following," CVGIP, vol. 30, no. 1, pp. 32-46, 1985, the entire disclosure of which is incorporated herein by reference in its entirety. Each 2D contour point 406 is associated with a 3D contour point 408 of the 3D CAD model 402 for that pose. In embodiments using multiple templates, the template creation process is repeated for multiple poses of the object. In one example, templates are created for poses separated by ten degrees. Training data that includes the template and the CAD model at the aligned pose is uploaded to the control section 10. In some embodiments, the training data includes additional data, such as colors, textures, and the like. In still some embodiments, it is not necessary for the training data to contain the CAD model.

After the training data is uploaded, the HMD may be operated. In use, an image frame 306 including a representation 308 of the object 304 is acquired, such as by the control section 10, from the camera 60. In the example embodiment, an image pyramid is created from the image frame. The image pyramid includes multiple different resolution versions of the image frame. The original image frame is the highest resolution image frame in the image pyramid and each of the created image frames has a lower resolution than the original image frame. In the example embodiment, the lowest resolution image frame is used for the template matching. Alternatively, any other image frame in the pyramid may be used for template matching. The specific resolutions of the image frames in the pyramid may be selected at any appropriate resolutions. In an example embodiment, the lowest resolution image frame has a resolution of about 80 by 60 pixels.

The processor 140 compares the template to the image frame and determines multiple candidate locations in the image frame having a correlation with the template exceeding a predetermined threshold.

To match the template to the image frame, a normalized cross correlation with no mean subtraction using:

$$R(x, y) = \frac{\sum_{x',y'} T(x', y') I(x+x', y+y')}{\sqrt{\sum_{x',y'} T(x', y')^2 \sum_{x',y'} I(x+x', y+y')^2}} \quad (1)$$

-continued $$R(x, y) = \frac{\sum_{x',y'} T(x', y') I(x+x', y+y')}{\sqrt{\sum_{x',y'} T(x', y')^2 \sum_{x',y'} I(x+x', y+y')^2}}$$

Figure 5:
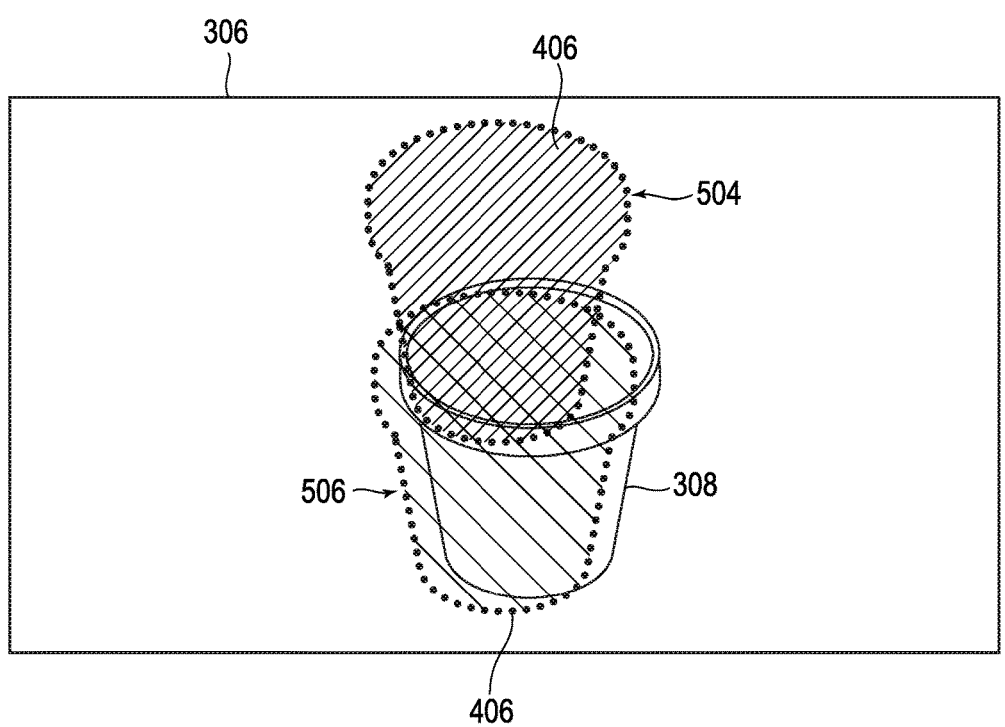
FIG. 5 is an example image frame including a representation of an object and a template.

The global maximum and the local maxima of the response map R(x, y) determined using equation (1) are identified. All local maxima locations $(x_i, y_i)$ that have a correlation with the template exceeding a threshold value and that are within a predetermined percentage of the global maximum are selected as candidate locations. In the example embodiment, local maxima that exceed a correlation score of 0.7 and are within 70% of the global maxima are selected as initial candidate locations. The initial candidate locations are sorted by their response. If there are less than K initial candidate locations, all initial candidate locations are selected as the candidate locations for edge refinement. If there are more than K initial candidate locations, only the top K initial candidate locations are selected as the candidate locations for edge refinement. In the example embodiment, K is twenty. In other embodiments, K may be any other suitable number of candidate locations. FIG. 5 is an example image frame 306 including a representation 308 of the object 304. The 2D contour points 406 of the template 404 are shown positioned on image frame 306 at two candidate locations 504 and 506.

After the candidate locations (504, 506) are determined, edge refinement (sometimes also referred to as edge registration) is performed on at least one of the candidate locations (504, 506). Edge refinement employs non-linear minimization and thus uses an initial guess for a pose. The training pose in the training data is used as an initial guess for the initial pose. However, the projected edges from the training pose may not correspond to the location of the object in the image frame. Therefore, for the first iteration of edge refinement, the location of the projected model edges are shifted as required based on the candidate locations from the template matching results. Because, the template may only roughly match the object, the initial contour from the training pose may be quite misaligned with the object in the image frame. Accordingly, considerably larger search range for edges is used than the search range used for edge alignment during tracking (which will be described in more detail below).

An iterative edge alignment process is applied to each of the K candidate locations (504, 506) in order from best to worst. The edge alignment process includes M number of iterations, where M is an integer greater than or equal to one. In an example embodiment, M is four. As will be described in more detail below, in the first iteration, 2D contour points of the object in the image frame (corresponding to the edges of the object) are detected relative to the 2D contour points 406 of the training pose at the candidate location and used, along with the corresponding 3D contour points of the training pose, to derive a refined pose of the object. For each subsequent iteration, new 2D and 3D contour points are determined based on the refined pose resulting from the previous iteration. The new 2D contour points are used to detect the 2D contour points of the object and used to derive another refined pose. If all of the K candidates are subjected to the edge alignment process without a successful edge refinement result, a failure is reported and the template matching and edge refinement process are repeated on the next image frame to be received. If one of the candidate locations resulted in successful edge refinement, the edge refinement process is stopped (without exploring the rest of the candidate locations).

The iterative edge alignment process will be described with reference to the first iteration using the training pose as an initial guess for the pose in the image frame. During successive iterations, the refined pose (and its associated 2D and 3D contour points) replaces the training pose (and its associated 2D and 3D contour points).

The iterative edge alignment process begins with the training pose of the object as the initial guess for the pose of the object in the image. As mentioned above, the template includes a plurality of 2D contour points representing the contour of the object in the pose and associated with corresponding 3D contour points of the CAD model. It is not necessary to use all the contour points for pose estimation. Instead, the 2D contour points are sampled at a regular interval to save up to a predetermined number of 2D contour points. In an example embodiment, one hundred 2D contour points are saved for use in edge refinement, but any suitable number of edge points may be used in other embodiments.

Correspondences between the 3D contour points of the CAD model in the training pose and the 2D contour points and edges of object in the image frame are determined by searching along lines perpendicular to the 2D contour at the 2D contour points. Without such a linearity constraint, not only will contour correspondence search be slow but it will also be ambiguous, because a model contour point can match to multiple image points on the same line.

Figure 6:
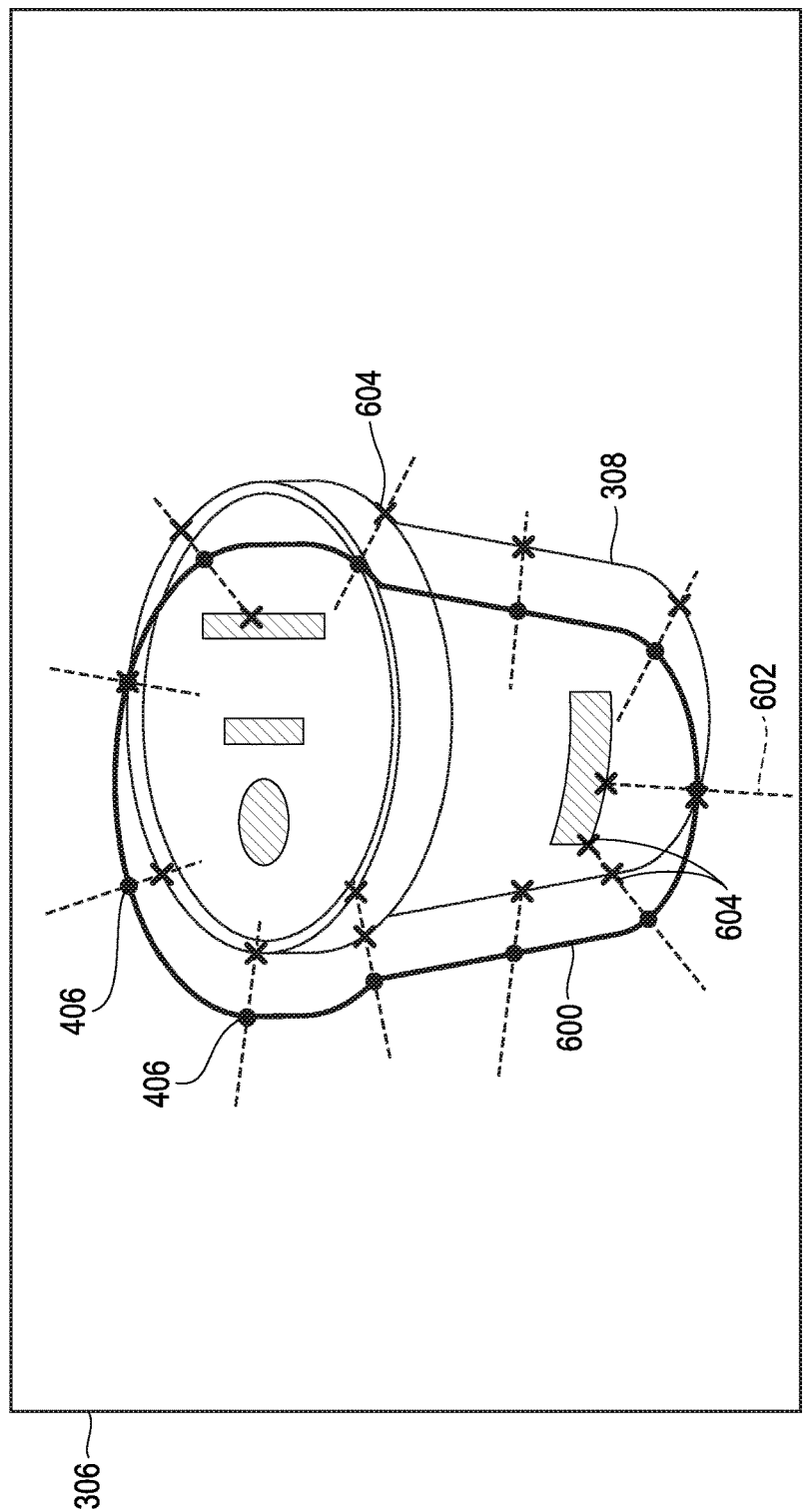
FIG. 6 is the image frame shown in FIG. 5 overlain with a contour derived from a training pose.

FIG. 6 is the image frame 500 overlain with the contour 600 derived from the training pose at the second candidate location 506. For clarity, only eleven contour points 406 are shown in FIG. 6. In practice many more, for example one hundred, contour points 406 may be used during edge registration. Each line 602 passes through a different one of the 2D contour points 406 and is substantially perpendicular to the contour 600 at the 2D contour point through which it passes. Processor 140 searches along each line 602 to find edges of the object 502 in the image frame. Each edge that is detected is identified as a potential image contour point. Correspondence between 2D contour points from the training pose and image 2D contour points are determined by matching the orientation of the model edges to the underlying image edges. Points in the image frame along the search line 602 that are located at a local gradient maximum and whose gradient orientation is similar to the orientation of the search line are marked as potential correspondences for the current model contour point 406. Because edge orientation alone is a weak matching feature, all the potential image contour points are saved initially. Several potential image edge contour points 604 are shown in FIG. 6. The result of the edge correspondence process is a list of $N_E$ 3D edge points $\{E_i\}_{i=1}^{N_E}$, and a list of multiple 2D correspondences per point $\{e_{ij}\}_{i=1}^{N_E}$ where j indexes the different correspondences for point i.

In some embodiments, the potential image contour points are filtered to remove potential image contour points that are unlikely to actually represent edges of the object in the image frame.

After the potential image contour points 604 have been detected, the association of the image contour points and the 2D contour points from the training pose are used to determine correspondences between the image contour points and the 3D contour points of the training pose. Based on these correspondences, a refined pose is derived to attempt to minimize the difference between the points. The edge refinement process then continues to the next iteration using the refined pose instead of the training pose.

In the example embodiment, the refined pose from the final iteration of the edge refinement process is subjected to several additional verification steps. In other embodiments less than all of the additional verification steps, including none of the verification steps, are performed.

The first verification is a refinement-based verification. Success is reported if a sufficient number of model contours were matched and the number of outliers from PnP is sufficiently small. However, this condition is easy to satisfy when the search range for correspondences is large. Therefore, an additional iteration of refinement (finding correspondences and PnP) with a very small search range is performed. After running this iteration, it is much more likely that incorrect poses will either generate an insufficient number of edge correspondences or a large number of outliers from PnP.

The second verification is an alignment-based verification. After the final pose refinement iteration, one extra search for edge correspondences is performed with a short search range. For well-aligned poses, most model edges are expected to find a corresponding image edge.

The third verification is an appearance verification. The previous verifications were based on external contour alignment. In order to verify how well the internal structure of the model matches the image, normalized cross correlation is again applied. To that end, a dense list of points on the object at the training pose is recorded along with their intensities. These points are back projected onto the CAD model. For verification, the points from the CAD model are projected onto the image frame using the refined pose. The normalized cross correlation (this time with mean subtraction) between the intensities recorded at training time and the intensity observed at run-time is then calculated. To pass the appearance test, normalized cross correlation should be above a threshold. In the example embodiment, the threshold is 0.2.

Divergence verification is the fourth verification. The refined pose should have similar visibility, similar in-plane rotation, and similar scale as the training pose. If that is not the case, the refinement process is likely to have diverged and a failure is reported.

If edge refinement fails, the current image frame is abandoned and the entire process, e.g., template matching and edge refinement, is performed on the next image frame in the image data stream. In some embodiments, after a successful edge refinement, control section 10 outputs a display image for display on a display device (such as displays 26 and/or 28) before proceeding to tracking the object in subsequent image frames. The display image's location and/or the content of the display image are determined based on the determined initial pose of the object.

If the edge refinement is successful, the refined pose is stored as the initial pose and the control section 10 begins tracking the object 304 in the succeeding image frames 306 of the image data stream. The algorithms used by the HMD 100 to track an object through successive image frames 306 are sometimes referred to herein as the tracker and may include software and hardware.

To better track both rich and low textured objects, tracking is performed by HMD 100 using different first and second features of a tracked object 304. In the example embodiment, the first and second features are textured (e.g. corners) and un-textured (e.g. edges) features, respectively, of the object. Tracking using the edges of the model enables correction for drift, resulting in a tracker that is not only robust to the lack of texture but also has low drift. Such a tracker facilitates augmented reality applications where the object does not have a lot of texture and pose accuracy is important, such as providing 3D virtual assistance for maintenance purposes.

Generally, tracking is performed in the example embodiment by continuously updating the pose by keeping track of both the corners and the edges of the object in the image frames. First corners are extracted for an object in an image frame and back-projected unto the 3D model given the current pose. In successive frames, the corners are tracked using a Kanade-Lucas-Tomasi (KLT) algorithm and the pose is calculated by solving the PnP problem. Occasionally, when the number of tracked corners drops below a threshold or when a given number of frames 306 has passed, new corners are extracted and back-projected on the 3D model. To handle possible drift and difficulty with low textured objects, the example embodiment uses edge correspondences together with the corner tracking with the KLT algorithm. In addition to tracking a set of corners on the object using the KLT algorithm, a set of edge points (e.g. 2D image contour points) is tracked. After the KLT-based corner tracking 3D points and the tracked 2D points are used to calculate pose by solving PnP problem at each image frame, the pose is further refined using a cost function that combines the re-projection errors from the tracked corners together with errors from the projected model edges and image edges.

Figure 7:
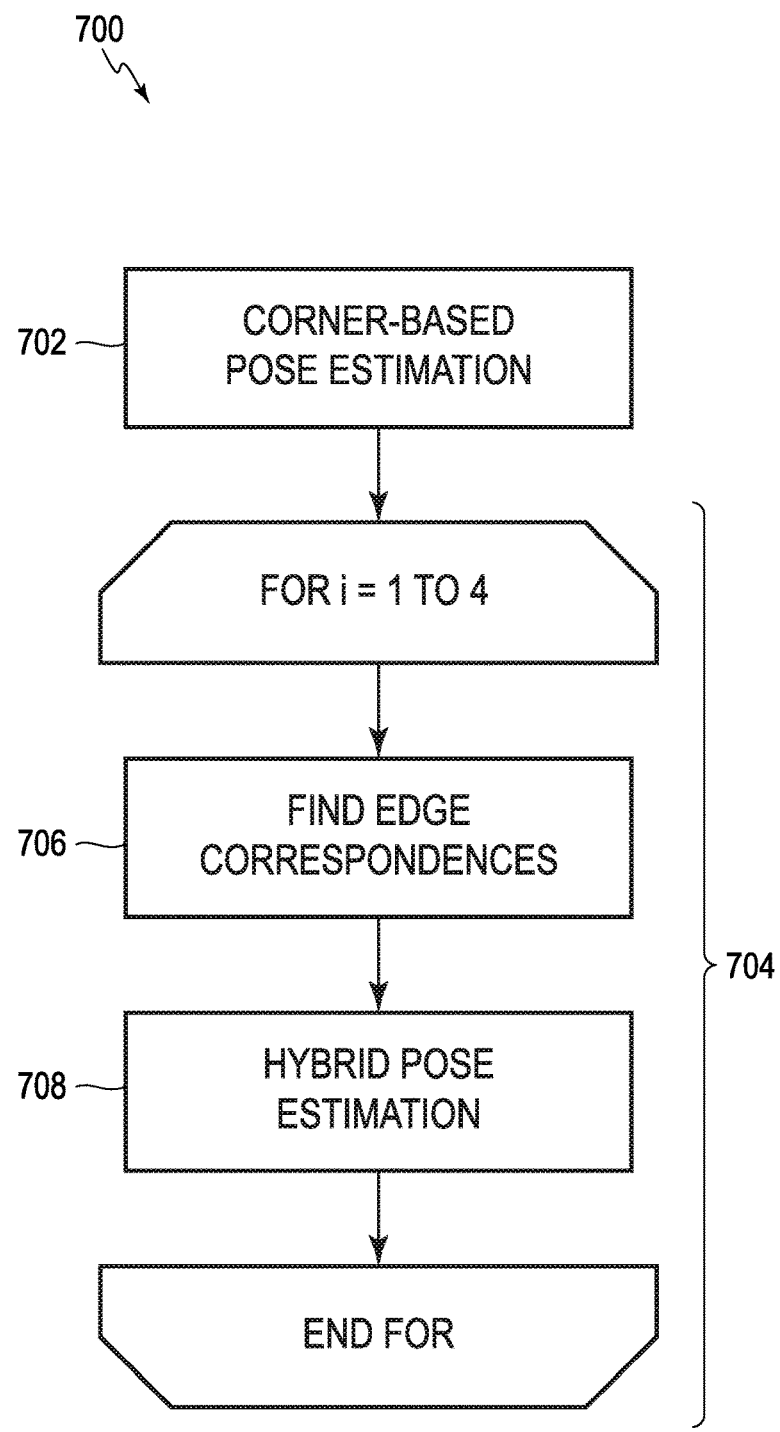
FIG. 7 is a flow diagram of an overall tracking algorithm for use with the HMD shown in FIGS. 1 and 2.

FIG. 7 is a flow diagram of the overall tracking algorithm 700 of the example embodiment, sometimes referred to herein as hybrid edge and corner based tracking. The tracking algorithm 700 is applied to each image frame in an image data stream. At step 702, a corner-based pose estimation is conducted on the current image frame 306. Edge-based tracking 704 is an iterative process expressed in FIG. 7 as a for-loop. The loop repeats four times in the example embodiment. In other embodiments, the loop may repeat more or fewer times. In some embodiments, the number of repetitions in the loop may be variable based on another factor, such as the amount of displacement of the object 304 in the image frame 306 relative to its position in the previous image frame. During the edge-based tracking loop 704, edge correspondences between edges of the representation of the object in the current image frame and the edges of the 3D model in the current pose are determined at step 706. At step 708, hybrid pose estimation is performed based on the edge correspondences and the tracked corner correspondences. The result of the hybrid pose estimation is used as the current pose for the next iteration of the edge-based tracking loop 704. The various aspects of the hybrid edge and corner based tracking shown in FIG. 7 will be described in more detail below.

Figure 8:
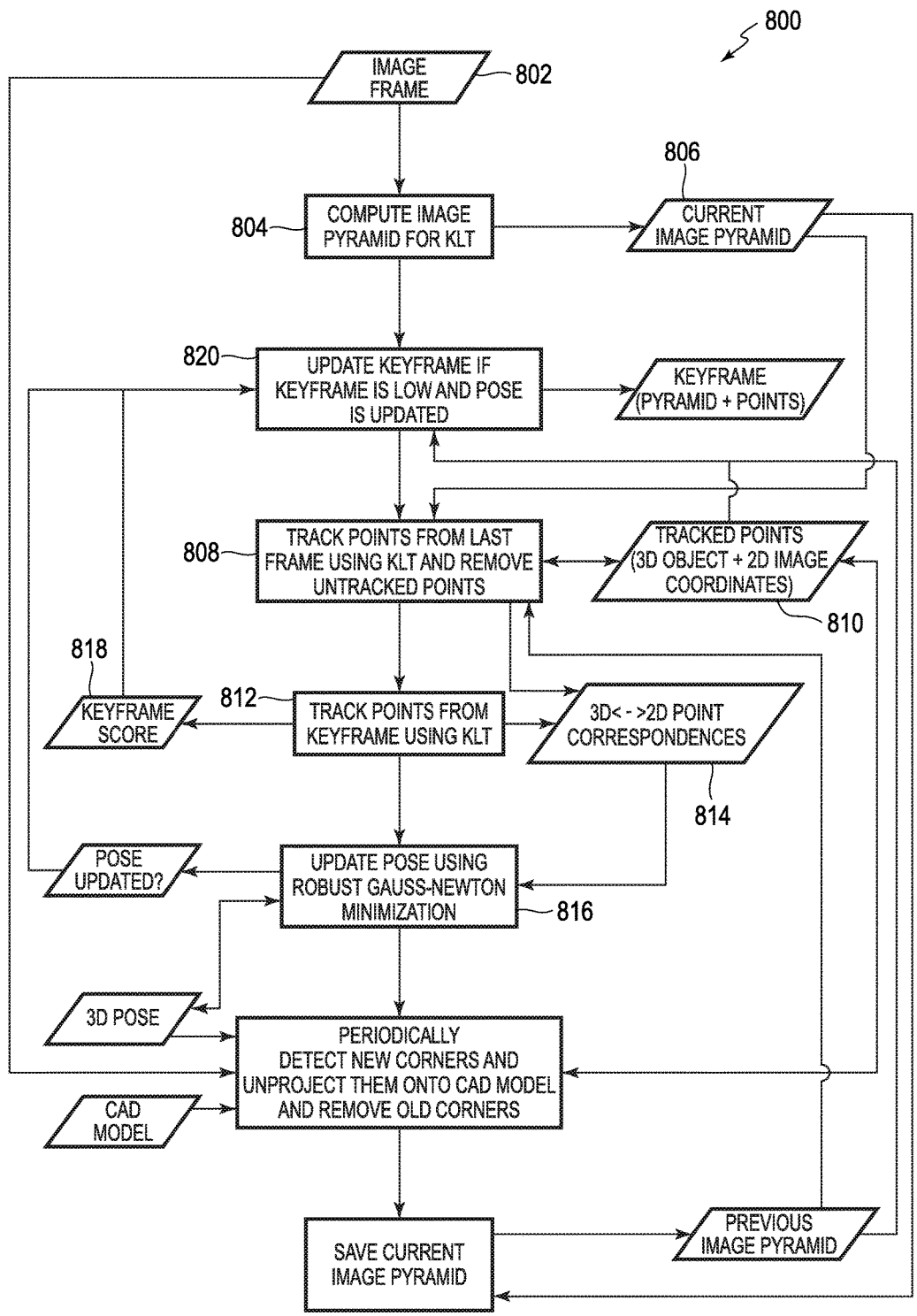
FIG. 8 is a flow diagram of a corner-based pose estimation step of the algorithm shown in FIG. 7.

FIG. 8 is a flow diagram 800 of the corner-based pose estimation step 702 of the hybrid edge and corner based tracking 700. The sparse feature tracking framework tracks a sparse set of corners using multiscale KLT. The tracked corners are extracted every few frames and back-projected unto the CAD model surface. The 6-DOF pose is recovered by solving the PnP problem, using the correspondences between the 3D corners on the model and their tracked 2D locations in the current frame 306.

Prior to the first execution, the initial 3D pose (determined for example as discussed above) is set, the keyframe is cleared, the list of tracked points is cleared, and the list of 3D to 2D point correspondences is cleared.

The corner-based pose estimation begins at step 802 with receiving a current image frame, j. An image pyramid is created at step 804 from image frame j and stored as the current image pyramid 806. The image pyramid 806 includes multiple different resolution versions of image frame j. The original image frame is the highest resolution image frame in the image pyramid and each of the created image frames has a lower resolution than the original image frame. The specific resolutions of the image frames in the pyramid may be selected at any appropriate resolutions. In an example embodiment, the lowest resolution image frame has a resolution of about 80 by 60 pixels.

At steps 808-814, the corner tracking compares feature points (e.g. corners) in the current image against the tracked feature points in the previous image frame, j−1, and in a periodically updated keyframe, i. During the initial pass through the method, there is no keyframe and the comparison with the keyframe is omitted. The first image frame is then stored as the keyframe and the comparison with the keyframe is implemented for subsequent image frames. In the example embodiment, tracking using the keyframe occurs at a present frame interval, for example every ten frames. In other embodiments, keyframe tracking occurs in every frame after the first frame. If the pose of the object in the image frames changes over a sequence of frames, the correspondence between the corners in the image frame and the key frame may decrease, for example as features in the keyframe are no longer visible in the image frame. The keyframe correspondence is scored during the tracking at step 818. If the score for the keyframe decreases below a threshold, the keyframe is updated to the current image frame j at step 820 if the pose is also updated.

Because the image frames are consecutive image frames in a video sequence (also referred to as the image data stream), feature points undergo relatively minor motion between two consecutive frames and a pyramidal implementation the KLT method is used to track points between image frames. In other embodiments any other suitable feature method may be used, including any other suitable optical flow algorithm. As mentioned above, the feature points are corners. The corners are extracted using a Features from Accelerated Segment Test (FAST) corner detector. New corners are not detected at every frame in the example embodiment. Corner detection occurs at a preset frame interval or when the number of tracked corners drops below a threshold.

Generally, given a set of N corresponding 2D feature points (e.g. corners) in image frames i and j, $\{x_k^i, x_k^j\}_{k=1}^N$, and the 3D transformation from the CAD model to the camera frame of reference in frame i, $P_i$, the 3D pose in frame j can be derived by minimizing the following cost:

$$C = \Sigma_{k=1}^N \|\Pi(P_j P_i^{-1} \Pi^{-1}(x_k^i)) - x_k^j\|^2 \qquad (2)$$

where $\Pi^{-1}(x)$ is the back-projection of point x from the 2D image to the 3D camera frame of reference.

Because the 2D points $x_k^i$ can be back-projected and transformed into the CAD model frame of reference in advance, the problem above reduces to the PnP problem. To add robustness to outliers in the 2D correspondences, rather than minimizing the squared re-projection error, a robust function of the re-projection error, $\rho(x)$ is minimized. In the example embodiment, the Tukey robust estimator is used. Alternatively, any other suitable estimator may be used.

Periodically (e.g. at a preset frame interval) rather than minimizing equation (2) for corner points correspondences between frames i and j only, it is minimized jointly for corner points coming from consecutive frames $\{j-1,j\}$ and point correspondences between a key frame i and the current frame j. Equation (2), thus becomes:

$$C'=\Sigma_{k=1}^{N_1}\rho(\Pi(P_jP_i^{-1}\Pi^{-1}(x_k^i))-x_k^j)+\Sigma_{k=1}^{N_2}\rho(\Pi(P_jP_{j-1}^{-1}\Pi^{-1}(x_k^{j-1}))-x_k^j) \quad (3)$$

The first term in equation (3) maps to key frame correspondences and the second term maps to correspondences from the previous frame. Because all of the 2D points from both the key frame and the previous image frame can be converted to 3D points, at steps 814 and 810 respectively, in the CAD model 402 frame of reference in advance, the two terms can be merged into one large sum, resulting in yet another PnP problem:

$$C''=\Sigma_{k=1}^{N}\Sigma(\Pi(P_jX_k)-x_k^j) \quad (4)$$

Given an initial estimate for the pose $P_j$, such as the pose derived for the previous image frame, j−1, the above cost can be minimized using a non-linear least squares method such as Gauss-Newton (GN) or Levenberg-Marquardt (LM). If an initial pose is not available, C can be minimized using RANSAC, for example. Any suitable PnP solution may be used, such as GN with a square re-projection error cost, LM with a square re-projection error cost, GN with a robust Tukey error, and RANSAC with a square re-projection error cost. The example embodiment uses GN minimization at step 816.

In some embodiments, after recovering a 3D pose, the confidence of the pose update is estimated. Pose update confidence can be a function of the re-projection error. Pose confidence is determined as the fraction of inliers, the points whose re-projection error is below a threshold. In an example embodiment, if the fraction of inliers is below 50% the pose is not updated and the current (un-updated) pose is used as an initial pose for the next image frame.

The resulting pose of the object after the corner-based tracking, whether it is an updated pose or not is used as an input to the edge-based tracking loop 704. Unlike the corners, which are extracted from the image, edge points are extracted directly from a CAD model 402 and thus their accuracy is not affected by having an imperfect pose. At each frame, in addition to the corner-based correspondences, correspondences between the 3D edge points and the edges in the image are also established. The combined set of correspondences is used to refine the pose.

Initially, the edge correspondences are located for the current frame. Given a pose from the corner-based tracking, the CAD model 402 is rendered at that pose and the boundaries between the object mask and the background are traced to extract a closed sequence of 2D contour points. Boundary points are determined to be points belonging to the mask that have a neighboring background pixel. Once the 2D contour sequence is computed, all of the 2D contour points 406 are back-projected onto the CAD model 402 surface yielding a 3D contour sequence.

Contour tracing is performed using the algorithm of Suzuki and Abe, "Topological Structural Analysis of Digitized Binary Images by Border Following," CVGIP, vol. 30, no. 1, pp. 32-46, 1985, which is incorporated herein by reference in its entirety. Not all of the contour points 406 are used for pose estimation. Rather, the contour is sampled at a regular interval and up to a predetermined number of edge points are stored. In the example embodiment, the predetermined number of edge points is one hundred.

Next, the correspondences between the sampled model contour points and image edges are determined by matching the orientation of the model edges to the underlying image edges. As described above with respect to FIG. 6, the search for corresponding image edge points is constrained to a line perpendicular to the model contour. The lines 602 that are used in the edge-based registration loop 704 are generally shorter than those used during the initial pose detection, because the model contour is likely much closer to alignment during the loop 704 (due to the previous application of the corner-based tracking algorithm). Without such a linearity constraint, not only will contour correspondence search be slow, but it will also be ambiguous, since a model contour point can match to multiple image points on the same line. Image points along the search line 602 that are located at a local gradient maximum and whose gradient orientation is similar to the orientation of the search line 602 are marked as potential correspondences for the current model contour point 406. Since edge orientation alone is a weak matching feature, all the potential corresponding image points for each model point are saved. The result of the edge correspondence process is a list of $N_E$ 3D edge points $\{E_i\}_{i=1}^{N_E}$, and a list of multiple 2D correspondences per point $\{e_{ij}\}_{i=1}^{N_E}$ where j indexes the different correspondences for point i.

After the edge correspondences have been determined, the hybrid pose estimation 708 is performed.

For simplicity, all the corner-based correspondences are combined into a single list of $N_R$ correspondences with the 3D corners defined as $\{P_i\}_{i=1}^{N_R}$ and the corresponding 2D corners defined $\{p_i\}_{i=1}^{N_R}$. As described above, the corner-based correspondences include frame-to-frame correspondences and keyframe-to-frame correspondences. To recover the pose from corner and edge-based correspondences, the following cost function C is minimized:

$$C=\Sigma_{i=1}^{N_R}\rho(\Pi(\text{Pose}\cdot P_i)-p_i)+\Sigma_{i=1}^{N_E}\min_j\rho(\Pi(\text{Pose}\cdot E_i)-e_{ij}) \quad (5)$$

The first term in equation (5) is the sum of robust re-projection errors for all of the corner-based correspondences. The second term is the sum of robust re-projection errors between a model edge point (also referred to as a 3D contour point) and the closest corresponding image edge point (also referred to as an image contour point 604).

Directly minimizing the hybrid PnP cost in equation (5) to recover the pose may cause problems. First, if the pose change between consecutive frames is large, it may not be possible to recover reliable edge correspondences. Secondly, due to the search line constraints, initially the obtained edge correspondences may not be accurate. They may accurately map a model point to a correct image contour 600, but will not recover the correct position along that contour 600.

Thus, to handle the first issue, a more accurate pose estimate prior to minimizing the hybrid cost in equation (5) is obtained. This is done by minimizing the corner-based only cost first as described above. Edge correspondence recovery and hybrid pose refinement uses this refined pose as a starting point, which should be much closer to the target pose than the pose at the previous frame.

To handle the second issue, rather than minimizing equation (5) once, it is iteratively minimized as part of the edge-based tracking loop 704. The control section 10 iterates multiple times between edge correspondences estimation 706 and hybrid pose estimation 708 (i.e. minimization of equation (5))

It is not necessary to render the 3D CAD model mask at each iteration. Instead, the contour 600 is extracted only during the first iteration. For the remaining iterations the current sequence of 3D edge points are projected using the new pose estimate to directly recover a new 2D contour.

Finally, several practical considerations are described. First, while the corner-only pose estimation typically helps, in cases of low texture objects it may result in an inaccurate pose. Thus, control section 10 checks whether or not the corner-only pose is reliable and uses it only if it is. Secondly, even though most of the time the pose estimate after hybrid refinement improves, it is not guaranteed. If the pose after hybrid refinement is deemed inaccurate, the original corner-based pose is used. Thirdly, in the first few iterations of the edge-based tracking loop 704, the recovered edge correspondences may be considerably incorrect. To avoid over-penalization of such correspondences during robust estimation in hybrid pose refinement, the threshold for outliers is initially set very high and is decreased at each iteration. Lastly, some embodiments do not recover the 3D edge points at each frame or do not do it online at all. For example, objects whose surface visibility does not change frequently, such as convex polygonal objects, may not need the 3D edge points recovered very frequently. In such embodiment, the 3D edge points may be recovered at a predefined frame interval or recover it offline from a set of densely sampled views around the object. Using offline 3D edges, the resulting hybrid tracker is not significantly more expensive than the corner-based tracker, while providing many benefits in terms of tracking accuracy.

In some embodiments, object appearance data may be used to facilitate recovering edge correspondences (rather than basing them solely on finding local gradient maxima along the search line perpendicular to the current model contour at a given point whose gradient orientation agrees with the search line orientation).

Because the object is being tracked over time, as long as tracking was successful on a previous frame, information about the object's appearance is known in addition to the geometric information that was extracted from the CAD model 402. In these embodiments, two sources of appearance information are used for edge point detection: edge polarity and grayscale patches.

For each potential corresponding point, the edge polarity is checked to determine whether or not the underlying image edge point agrees with the recorded polarity from the last frame. The polarity of an edge denotes whether or not the intensity is increasing or decreasing across the edge. That is, it may be the sign of the magnitude of the gradient.

A grayscale patch is recorded around each edge point and compared to a similar patch around each potential corresponding point in the subsequent frame. The potential corresponding points with a high matching correspondence in terms of sum of squared differences and the potential corresponding points with correspondences that are up to 25% worse than the best are kept.

Some embodiments also use edge correspondence smoothing to help filter the potential corresponding edge points that are detected as described above.

Neighboring edge points on the object are expected to match to the same image edge. In other words, for neighboring edge points, the location of the correct correspondence along their respective search lines should be similar. This fact is applied to the potential corresponding edge points to generate a more reliable set of correspondences.

Figure 9A:
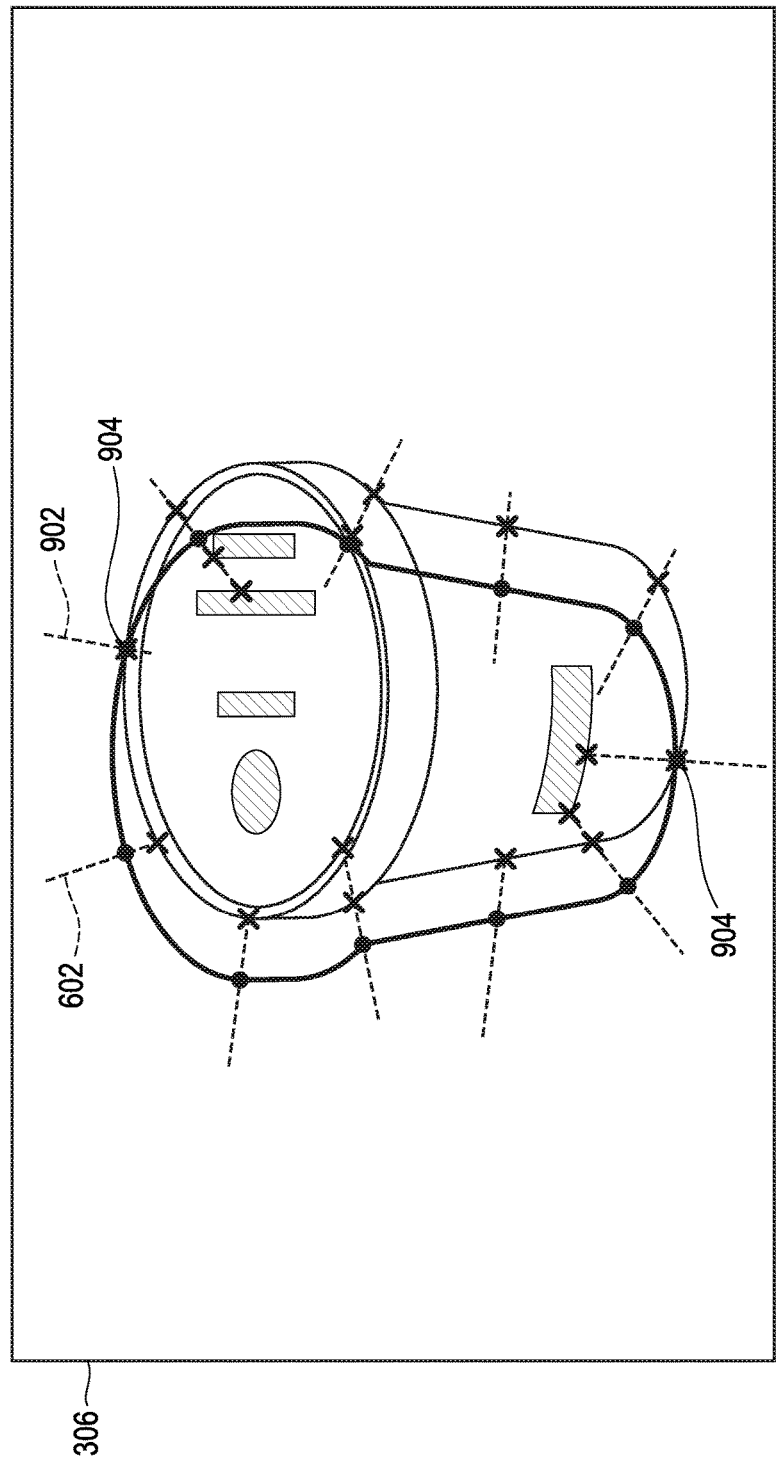
FIG. 9A is an example image frame including search lines and potential image contour points.
Figure 9B:
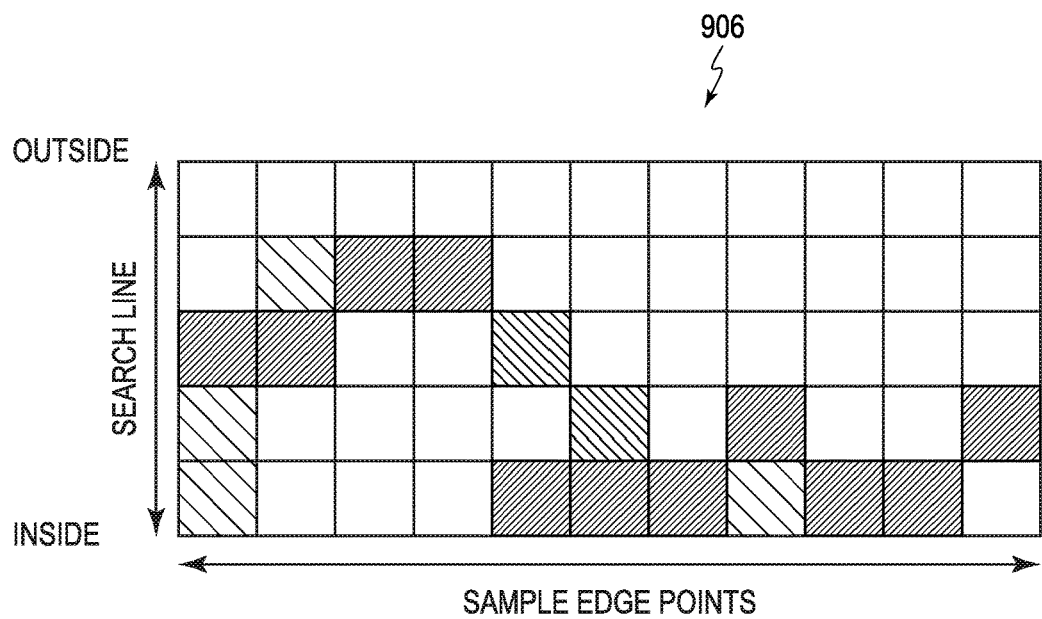
FIG. 9B is a table of edge correspondences for the image frame shown in FIG. 9A.

To that end, a table storing all the edge correspondences scores for each search line is created. FIG. 9A is an example image frame 306 with search lines 602 and potential image contour points 406. FIG. 9B is a table 906 of edge correspondences for image frame 306. Column i of the table represents search line scores for edge point i. Once all the edge points are processed and the table is generated, a smoothed version of the scores is calculated by filtering the table with a 2D Gaussian. The smoothing in the vertical direction is kept small, while the smoothing in the horizontal direction is larger to yield a more consistent score with respect to the neighboring edge points. Finally, each column in the smoothed score table is processed to find local maxima in the score and generate correspondences. In FIG. 9B where darker boxes indicate a better score.

For a typical edge point there is often an ambiguity of where exactly along the image edge the given edge point matches. Thus, in some embodiments, rather than minimizing the distance between the projected model edge points and potential corresponding image points, the distances between the projected model edge points and lines corresponding to the matching image edges are minimized. Instead of minimizing the distance between the projected model edge point and the closest corresponding image edge point (i.e., minimizing the second term in equation (5)), each image edge point $e_{ij}$ is assumed to correspond to a line $l_{ij}$ defined at correspondence estimation time as a line that passes through $e_{ij}$ and whose normal is equal to the normalized image gradient at $e_{ij}$. Equation (5), thus becomes:

$$C=\Sigma_{i=1}^{NR}\rho(\Pi(\text{Pose}\cdot P_i)-p_i)+\Sigma_{i=1}^{NE}\min_j\rho(D(\Pi(\text{Pose}\cdot E_i),l_{ij})) \qquad (6)$$

where D (p, l) is the distance between point p and line l.

In this embodiment, the distance between the projected model edges and the corresponding 2D image lines are minimized.

In other embodiments, for objects whose model edges can be well approximated by lines, the 2D contour can be approximated using a polygonal curve with N line segments. Each line segment can be sampled and correspondences between sample model line points and image points can be established. At pose refinement time, the distances of projected 3D lines are minimized to all the corresponding image points.

In some embodiments, if tracking of the object is lost, control section 10 performs template matching as described above to locate the object and resume tracking.

Moreover, in some embodiments, template matching can be used as an additional mechanism to determine the tracker state, i.e. whether the tracker is still successful or not.

In the example embodiment a single template is recorded and template matching is performed using normalized cross correlation. In other embodiments, multiple templates may be used. Additionally, the filter for template matching may be adapted to a changing object appearance.

Figure 10:
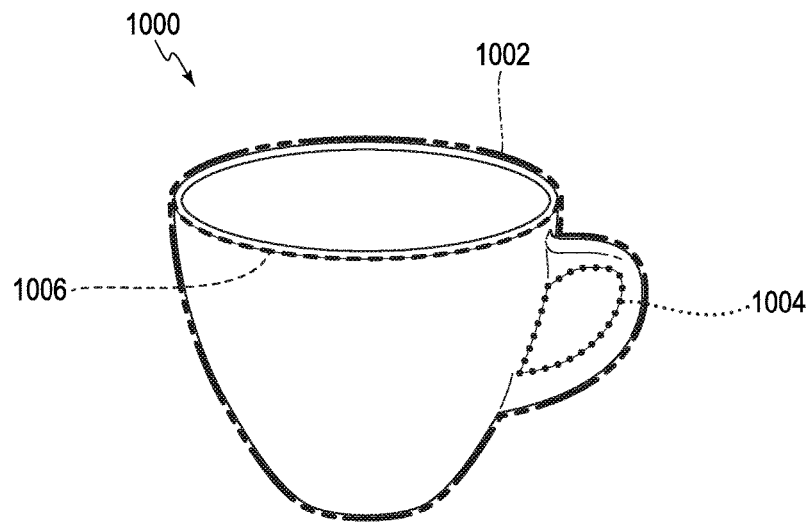
FIG. 10 is a diagram of a cup with a handle to illustrate different types of edges.

In the embodiments described above, only external object edges are used for alignment. There are other types of edges that may provide a strong source of useful information for alignment. Thus, in some embodiments, edge detection as described above is extended to internal edges, such as edges corresponding to object holes. FIG. 10 is a diagram of a cup 1000 with a handle to illustrate the different types of edges. In FIG. 10, line 1002 indicates external edges, line 1004 indicates internal holes edges, and line 1006 indicates internal edges.

In some embodiments, to get more corners on even low textured objects, the FAST corner detection threshold is lowered (for example, from 30 to 10), producing many more corners, many of which are not tracker reliable. However, this rich feature tracking typically still helps to obtain a much better pose estimate than simply starting with a previous frame's pose. In addition, unlike embodiment 2, at the end of each frame, the method according to these embodiments determines which, if any, corners are outliers and stops tracking corners that are outliers. As a result, corner-based pose updates are more likely to be successful (as the number of outliers is kept low) and corners may be extracted more frequently to keep up with the minimum required number of corners for corner-based tracking.

Figure 11:
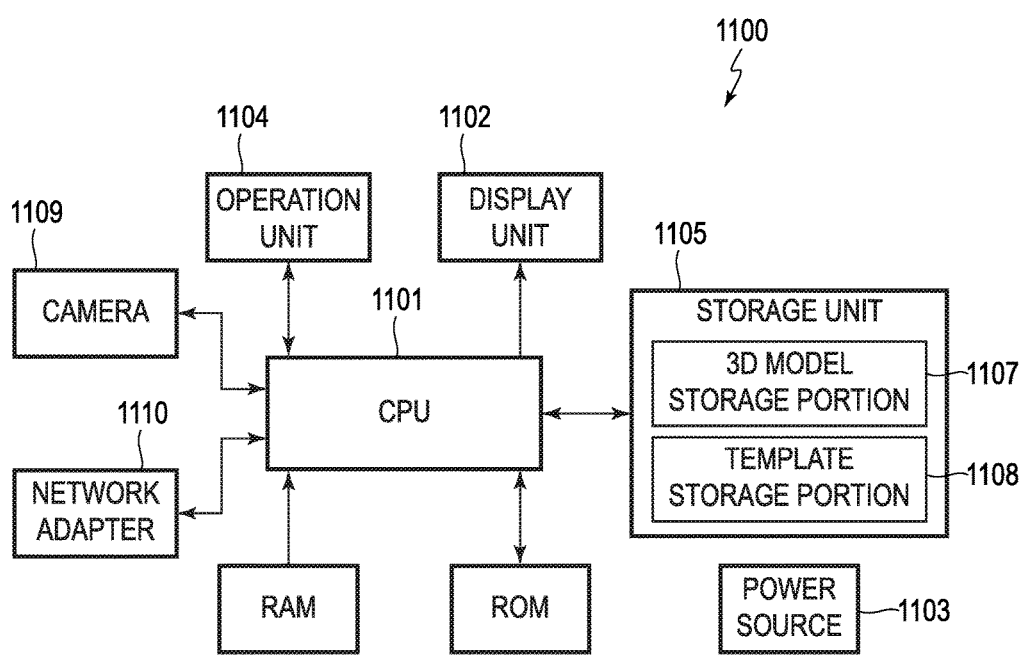
FIG. 11 is a block diagram illustrating a functional configuration of a computer for performing the methods of this disclosure.

FIG. 11 is a block diagram illustrating a functional configuration of a computer 1100 as an information processing device in the present embodiment which performs the methods described above. The computer 1100 includes a CPU 1101, a display unit 1102, a power source 1103, an operation unit 1104, a storage unit 1105, a ROM, a RAM, a camera 1109 and a network adaptor 1110. The power source 3 supplies power to each unit of the computer 1100. As the power source 1103, for example, a secondary battery may be used. The operation unit 1104 is a user interface (UI) for receiving an operation from a user. The operation unit 1104 includes a keyboard, a mouse and a touch pad and the like and their driver software.

The storage unit 1105 stores various items of data and computer programs, and includes a hard disk drive, a solid-state drive and the like. The storage unit 1105 includes a 3D model storage portion 1107 and a template storage portion 1108. The 3D model storage portion 1107 stores a three-dimensional model of a target object, created by using computer-aided design (CAD). The template storage portion 1108 stores a template created by a template creator (not shown). The camera 1109 is a RGB image sensor and used when the CPU 1101 acquires an image or a video sequence of a real object. The network adaptor 1110 is configured to allow CPU 1101 to communicate with other computer such as a server computer via a wireless network, so that, for example, the computer 1100 receives from the other computer a computer program that causes the computer 1100 to perform functions described in the above embodiments.

The CPU 1101 reads various programs from the ROM and develops the programs in the RAM, so as to execute the various programs. The CPU 1101 may function as a template creator that executes a program for creating a template. The template is defined as data in which, with respect to a three-dimensional model stored in the 3D model storage portion 1107, coordinate values of points (2D model points) included in a contour line (hereinafter, also simply referred to as a "contour") representing an exterior of a 2D model obtained by projecting the 3D model or 3D primitive onto a virtual plane on the basis of a virtual specific viewpoint (hereinafter, also simply referred to as a "view"), 3D model points obtained by converting the 2D model points into points in an 3D model coordinate system on the basis of the specific view, and the specific view are correlated with each other. The virtual viewpoint of the present embodiment is represented by a rigid body transformation matrix used for transformation from the 3D model coordinate system into a camera coordinate system and represented in the camera coordinate system, and a perspective projection transformation matrix for projecting three-dimensional coordinates onto coordinates on the virtual plane. The rigid body transformation matrix is expressed by a rotation matrix representing rotations around three axes which are orthogonal to each other, and a translation vector representing translations along the three axes. The perspective projection transformation matrix is appropriately adjusted so that the virtual plane corresponds to a display surface of a display device or an imaging surface of the camera. A CAD model 402 may be used as the 3D model. Performing rigid body transformation and perspective projection transformation on the basis of a view may be simply referred to as "projecting".

Figure 12A:
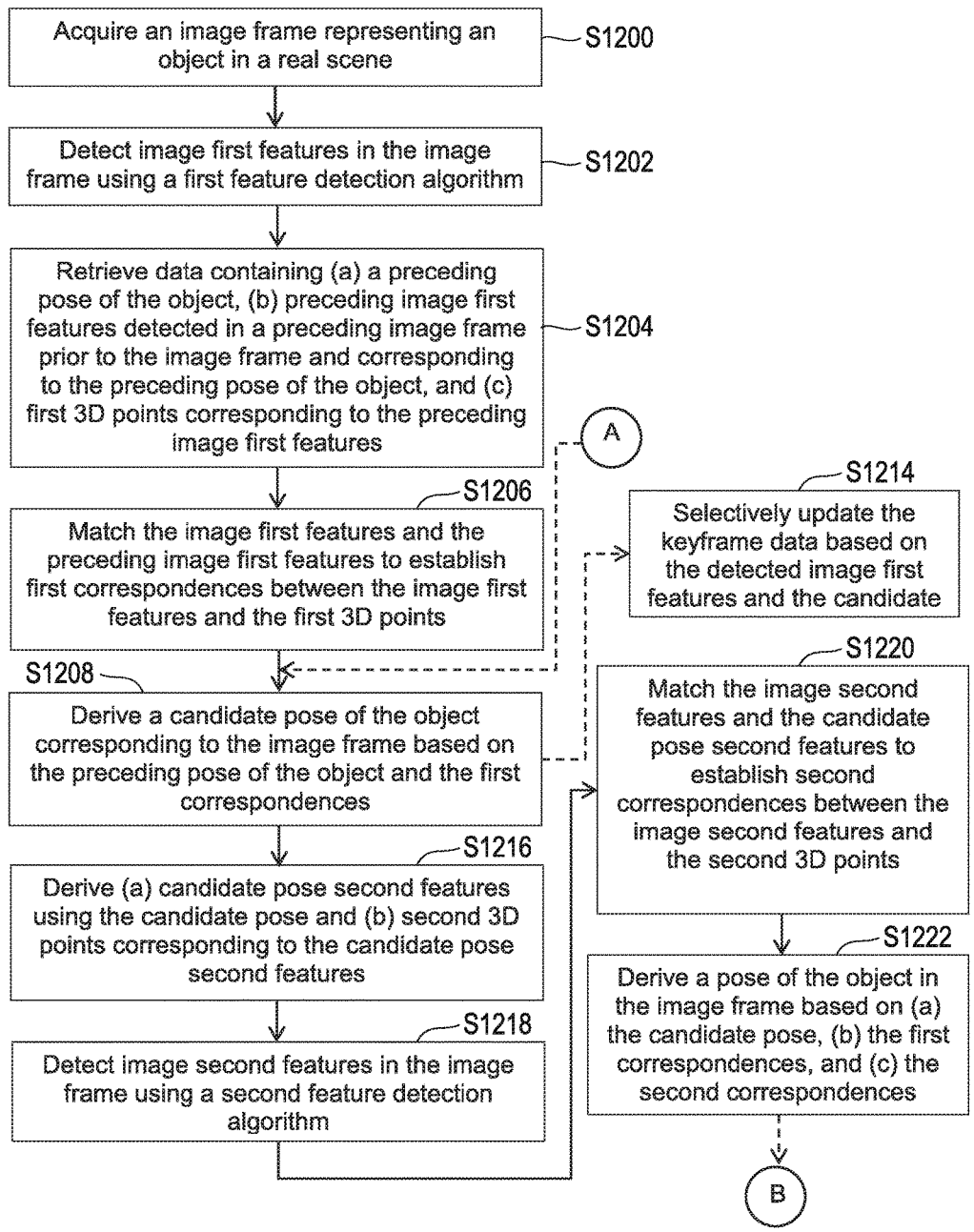
FIGS. 12A-12C are a flow diagram of an example method of tracking an object in an image frame.
Figure 12B:
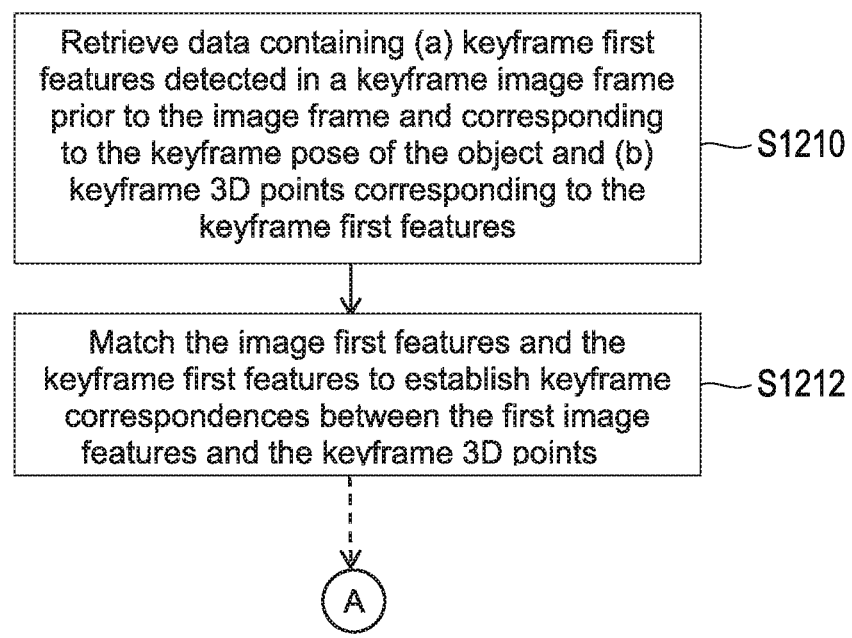
Figure 12C:
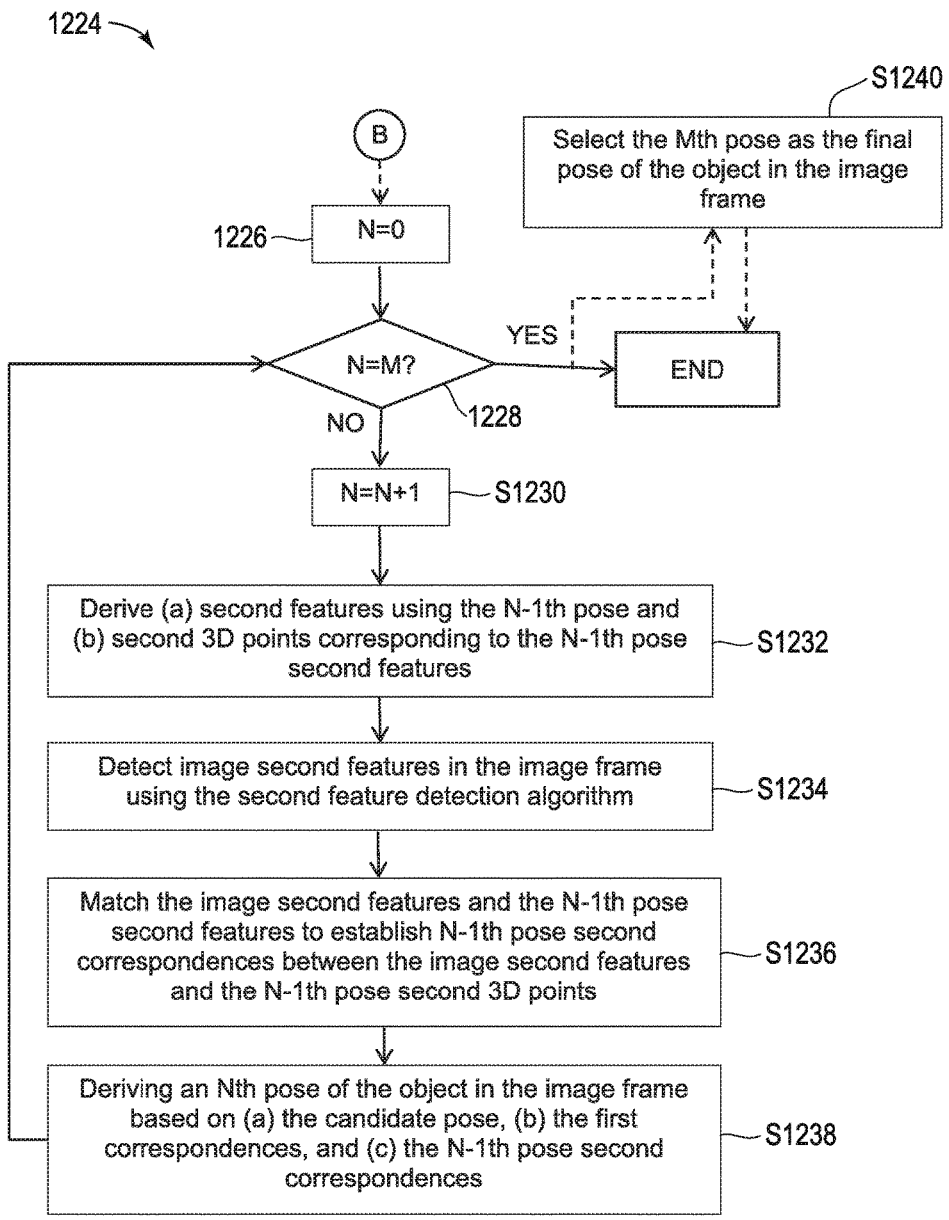

FIGS. 12A-12C are a flow diagram of an example embodiment of a method of tracking an object in an image frame. The method will be described with reference to HMD 100 and its components (shown in FIGS. 1 and 2), but may be performed by any suitable AR device in other embodiments.

Referring first to FIG. 12A, in S1200, the control section 10 acquires an image frame representing an object in a real scene from camera 60. The control section 10 detects image first features in the image frame using a first feature detection algorithm (S1202). In some embodiments, the first features are texture features, such as corner features, and the first feature detection algorithm is a texture feature detection algorithm, such as a corner detection algorithm. Moreover, in some embodiments, the first features may be a combination of different texture features.

In S1204, the control section 10, and more specifically the CPU 140, retrieves data containing (a) a preceding pose of the object, (b) preceding image first features detected in a preceding image frame prior to the image frame and corresponding to the preceding pose of the object, and (c) first 3D points corresponding to the preceding image first features. The data is retrieved from one or more memories, such as the RAM 122, the ROM 121, or any other memory suitable for storing data for use by CPU 140. The image first features detected in S1202 and the preceding image first features retrieved in 1204 are matched by CPU 140 to establish first correspondences between the image first features and the first 3D points (S1206).

In S1208, the control section 10 then derives a candidate pose of the object corresponding to the image frame based on the preceding pose of the object retrieved in S1204 and the first correspondences established in S1206. The candidate pose is derived using any suitable pose estimation algorithm, such as GN with a square re-projection error cost, LM with a square re-projection error cost, GN with a robust Tukey error, and RANSAC with a square re-projection error cost.

In some embodiments, the method also uses a keyframe to determine the candidate pose. Use of a keyframe, a selected earlier image frame with associated first features, may help reduce drift in the tracking of the object that might otherwise occur. With reference to FIG. 12B, in such embodiment, the CPU 140 retrieves, from one or more memories, keyframe data containing (a) keyframe first features detected in a keyframe image frame prior to the image frame and corresponding to the keyframe pose of the object and (b) keyframe 3D points corresponding to the keyframe first features (S1210). In S1212, CPU 140 matches the image first features detected in S1202 and the keyframe first features retrieved in S1210 to establish keyframe correspondences between the image first features and the keyframe 3D points. With reference back to FIG. 12A, the keyframe correspondences are used in S1208 to derive a candidate pose of the object corresponding to the image frame based on the preceding pose of the object, the first correspondences, and the keyframe correspondences.

In some embodiments that include S1210 and S1212, the method includes selectively updating the keyframe data based on the detected image first features and the candidate pose (S1214). Updating the keyframe includes, for example, selecting the current image frame as the keyframe, setting the candidate pose as the keyframe pose, setting the image first features as the keyframe first features, and setting the 3D points associated with the image first features as the keyframe 3D points. In some embodiments, S1214 is performed at a preset interval of frames, such as every five frames, every ten frames, every twenty frames, or the like. In other embodiments, S1214 is performed when a difference between the candidate pose and the keyframe pose exceeds a threshold. For example, S1214 may be performed when the candidate pose has the object rotated (in one or more axis) by more than a certain amount, when the number of image first features that have a corresponding keyframe first feature decreases below a threshold amount or by a predetermined percentage, or by any other suitable indicator of significant difference between the keyframe pose and the candidate pose.

After the candidate pose is derived, control section derives (a) candidate pose second features using the candidate pose and (b) second 3D points corresponding to the candidate pose second features (S1216) and detects image second features in the image frame using a second feature detection algorithm (S1218). The second features may be any features different form the first features that are suitable for use in tracking the object. In some embodiments, the second features are edge features (sometimes also referred to as contour features or contour points) and the second feature detection algorithm is an edge detection algorithm. The image second features detected in S1218 and the candidate pose second features from S1216 are matched by the CPU 140 to establish second correspondences between the image second features and the second 3D points (S1220).

In S1222, the control section 10 derives a pose of the object in the image frame based on (a) the candidate pose, (b) the first correspondences, and (c) the second correspondences. The pose is derived using any suitable pose estimation algorithm, such as GN with a square re-projection error cost, LM with a square re-projection error cost, GN with a robust Tukey error, and RANSAC with a square re-projection error cost.

In some embodiments, the method continues with an iterative hybrid pose refinement 1224 shown in FIG. 12C. Generally, the hybrid pose refinement 1224 is an iterative refinement of the pose that repeats S1218, 1220, and 1222 using the pose output by the last pass through the refinement (or the pose determined in S1222 during the first pass). S1218-1222 may also be considered the first (or $0^{th}$) pass of the hybrid pose refinement. The hybrid refinement is performed M times after deriving the pose of the object in S1222. M is a preselected integer representing the number of iterations of the hybrid refinement steps in FIG. 12C are to be performed. The value of M may be fixed, user selectable, variable, or a combination thereof. M may be varied, for example, based on the confidence of how closely the derived pose matches the actual pose of the object in the image frame, how large (or small) the difference is between the derived pose and the preceding pose of the object, or the like. In some embodiments, M is three.

For ease of explanation, each pass through the hybrid refinement is described as a loop of M passes, with each pass being an Nth pass. In practice, any suitable techniques for achieving the described iterative process M times may be used. The first pass starts with N equal to 0 (S1226). If M equals 0, N equals M at S1228, the method ends, and no hybrid refinement iterations are performed. When M is greater than 1, N (which is 0 at this point) does not equal M, N is incremented in step S1230, and the method continues to S1232. In S1232, the control section 10 derives (a) second features using an N−1th pose and (b) second 3D points corresponding to the N−1th pose second features. When N is 1, the N−1th pose (the $0^{th}$ pose) is the pose derived in S1222. Image second features are detected using the second feature detection algorithm (S1234), and the image second features and the N−1th pose second features are matched to establish N−1th pose second correspondences between the image second features and the N−1th pose second 3D points (S1236). In S1238, the control section 10 derives an Nth pose of the object in the image frame based on (a) the candidate pose from S1208, (b) the first correspondences from S1206, and (c) the N−1th pose second correspondences from S1236. The process then returns to S1228 to determine whether to repeat S1232-S1238 (if N does not yet equal M) or end (if N equals M).

In some embodiments that include the iterative hybrid pose refinement 1224, when M is equal to N, the Mth pose (which is also the Nth pose) is selected as the final pose of the object in the image (S1240) and the refinement 1224 ends. For example, after the third pass through the refinement 1224, if M is three, the third pose is saved as the final pose. The third pose may also be considered the fourth pose of the hybrid refinement, with the pose determined in S1222 being the $0^{th}$ pose.

Figure 13A:
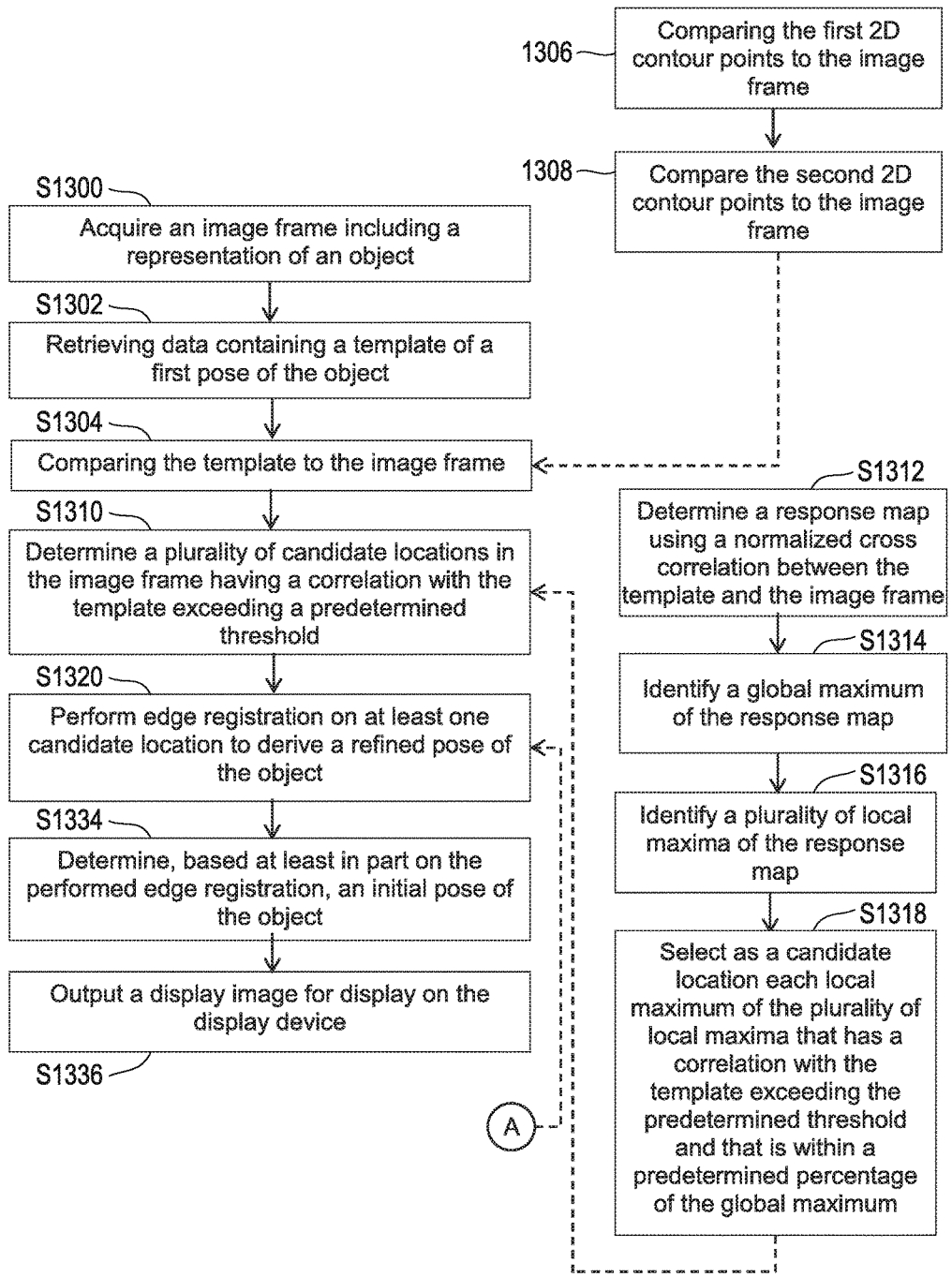
FIGS. 13A and 13B are a flow diagram of an example method of detecting an object in an image frame.
Figure 13B:
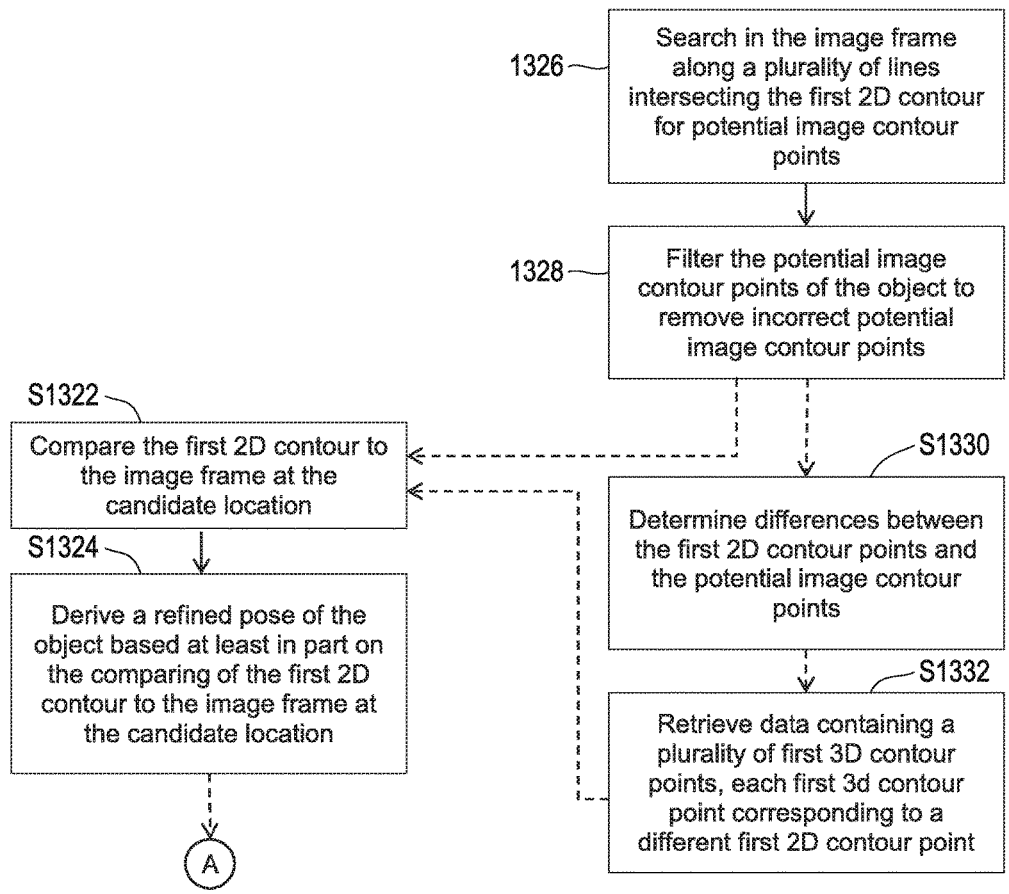

FIGS. 13A and 13B are a flowchart of a method of detecting an initial pose of an object in an image frame. The method will be described with reference to HMD 100 and its components (shown in FIGS. 1 and 2), but may be performed by any suitable AR device in other embodiments.

Referring first to FIG. 13A, in S1300, the control section 10 acquires, from camera 60, an image frame including a representation of an object. CPU 140 retrieves data containing a template of a first pose of the object from a memory (S1302) and compares the template to the image frame.

Any suitable method may be used for comparing the template to the image frame. In some embodiments, the template includes in S1302 a plurality of first 2D contour points of a first pose of the object (sometimes referred to as a training pose). The plurality of first 2D contour points represent a first 2D contour of the first pose of the object, which may be determined, for example, by projecting the a 3D model of the object in the pose to produce a 2D projection, and tracing the contour of the projection. In S1306, the first 2D contour points are compared to the image frame to compare the template to the image frame. In some embodiments, the template also includes a plurality of second 2D contour points that represent a second 2D contour of the object. In such embodiments, comparing the template to the image frame includes comparing the second 2D contour points to the image frame. IN other embodiments, the template may include any suitable number of groups of contour points representing any number of poses of the object. Some embodiments include multiple templates, each including a single set of 2D contour points representing a different pose of the object rather than a single template including multiple sets of 2D contour points. In such embodiments, comparing the template to the image frame includes comparing the multiple templates to the image frame.

In some embodiments, the comparison in S1304 is performed by normalized cross correlation with no mean subtraction. In other embodiments, any other suitable method of comparing the template to the image frame may be used.

Next, the control section 10 determines a plurality of candidate locations in the image frame having a correlation with the template exceeding a predetermined threshold (S1310). In some embodiments, determining the plurality of candidate locations in S1310 includes S1312-S1318. In S1312, a response map using a normalized cross correlation between the template and the image frame is determined by the control section 10. A global maximum of the response map is identified (S1314) and a plurality of local maxima of the response map are identified (S1316). In S1318, control section 10 selects as a candidate location each local maximum of the plurality of local maxima that has a correlation with the template exceeding the predetermined threshold and that is within a predetermined percentage of the global maximum. In some embodiments, the predetermined threshold is 0.7 and the predetermined percentage of the global maximum is seventy percent.

Following identification of the plurality of candidate locations, the control section 10 performs edge registration on at least one candidate location of the plurality of candidate locations to derive a refined pose of the object (S1320). The edge registration derives the refined pose based on the edges of the object and the template, rather than texture features of the object. With reference to FIG. 13B, in some embodiments, S1320 includes comparing the first 2D contour from the template to the image frame at the candidate location (S1322), and deriving a refined pose of the object based at least in part on the comparing of the first 2D contour to the image frame at the candidate location (S1324).

In some embodiments, comparing the first 2D contour to the image frame (S1322) includes S1326 and S1328. In S1326, the control section 10 searches in the image frame along a plurality of lines intersecting the first 2D contour for potential image contour points. Each line of the plurality of lines intersects a different first 2D contour point and is perpendicular to the first 2D contour at the first 2D contour point that it intersects. Next, the control section 10 filters the potential image contour points of the object (detected in S1326) to remove incorrect potential image contour points.

In some embodiments, the control section 10 determines differences between the first 2D contour points and the potential image contour points from S1328 (S1330). In such embodiments, in S1332, the control section 10 retrieves data containing a plurality of first 3D contour points. Each of the retrieved first 3D contour point corresponds to a different first 2D contour point.

Returning to the example embodiment and FIG. 13A, in S1334, control section 10 determines, based at least in part on the performed edge registration (S1320), an initial pose of the object. The control section 10 next outputs a display image for display on the display device, such as displays 26 and/or 28. One or both of the position at which the display image is displayed on the display device and the content of the display image are based at least in part on the determined initial pose of the object.

It should be understood that the methods described in FIGS. 12A-C and FIGS. 13A and 13B may be used separately (as described) or combined. Thus, a system (such as HMD 100) may use the method described with reference to FIGS. 13A and 13B for initial object detection, and use the method described with reference to FIGS. 12A-C for object tracking after the object is detected. Alternatively, the method described with reference to FIGS. 13A and 13B may be used by a system for initial object detection, and a method other than that described with reference to FIGS. 12A-C may be used by the system for object tracking after the object is detected. Conversely, a different method of object detection may be used by a system, and the method described with reference to FIGS. 12A-C may be used by the system for object tracking after the object is detected. In still other embodiments, one or both of the methods described with reference to FIGS. 12A-13B may be selectively used by a system. For example, a system may use a different object detection method initially and switch to the method described herein if the initial method fails to properly detect the object. Similarly, a system may use a different tracking method and switch to the tracking method described herein if it fails to track (or fails to satisfactorily track) the object using the original method.

Some embodiments provide a non-transitory storage medium (e.g. ROM 121, RAM 122, identification target storage medium 139) containing program instructions that, when executed by a computer processor (e.g. CPU 140 or processor 167), perform the methods described herein.

Although the invention has been described with reference to embodiments herein, those embodiments do not limit the scope of the invention. Modifications to those embodiments or different embodiments may fall within the scope of the invention.

What is claimed is:

1. A non-transitory computer readable medium that embodies instructions that cause one or more processors to perform a method comprising:
   acquiring, from a camera, an image frame representing an object in a real scene;
   detecting, from the image frame, image first features using a first feature detection algorithm;
   retrieving, from one or more memories, data containing (a) a preceding pose of the object, (b) preceding image first features detected in a preceding image frame prior to the image frame and corresponding to the preceding pose of the object, and (c) first 3D points corresponding to the preceding image first features;
   matching the image first features and the preceding image first features to establish first correspondences between the image first features and the first 3D points;
   deriving a candidate pose of the object corresponding to the image frame based on the preceding pose of the object and the first correspondences;
   deriving (a) candidate pose second features using the candidate pose and (b) second 3D points corresponding to the candidate pose second features;
   detecting, from the image frame, image second features using a second feature detection algorithm;
   matching the image second features and the candidate pose second features to establish second correspondences between the image second features and the second 3D points; and
   deriving a pose of the object in the image frame based on (a) the candidate pose, (b) the first correspondences, and (c) the second correspondences.

2. The non-transitory computer readable medium of claim 1, wherein detecting first image features by a first feature detection algorithm comprises detecting corners of a representation of the object in the image frame using a corner detection algorithm.

3. The non-transitory computer readable medium of claim 2, wherein detecting second image features by a second feature detection algorithm comprises detecting a plurality of contour points of the representation of the object using an edge detection algorithm.

4. The non-transitory computer readable medium of claim 1, further comprising:
   retrieving, from one or more memories, keyframe data containing (a) keyframe first features detected in a keyframe image frame prior to the image frame and corresponding to the keyframe pose of the object and (b) keyframe 3D points corresponding to the keyframe first features; and
   matching the image first features and the keyframe first features to establish keyframe correspondences between the image first features and the keyframe 3D points, wherein deriving a candidate pose of the object corresponding to the image frame based on the preceding pose of the object and the first correspondences comprises deriving a candidate pose of the object corresponding to the image frame based on the preceding pose of the object, the first correspondences, and the keyframe correspondences.

5. The non-transitory computer readable medium of claim 4, further comprising:
selectively updating the keyframe data based on the detected image first features and candidate pose.

6. The non-transitory computer readable medium of claim 1, further comprising:
performing a hybrid refinement M times after deriving the pose of the object in the image frame, where M is an integer equal to or greater than 1, the hybrid refinement comprising:
deriving (a) second features using an N−1th pose and (b) second 3D points corresponding to the N−1th pose second features, where N is an integer value of a current performance of the hybrid refinement and the 0th pose is the pose;
detecting, from the image frame, image second features using the second feature detection algorithm;
matching the image second features and the N−1th pose second features to establish N−1th pose second correspondences between the image second features and the N−1th pose second 3D points; and
deriving an Nth pose of the object in the image frame based on (a) the candidate pose, (b) the first correspondences, and (c) the N−1th pose second correspondences.

7. The non-transitory computer readable medium of claim 6, wherein M is three, and further comprising:
selecting the $3^{rd}$ pose of the object in the image frame as a final pose of the object in the image frame.

8. A method of detecting an initial pose of an object in an image frame, the method comprising:
acquiring, from a camera, an image frame representing an object in a real scene;
detecting, from the image frame, image first features using a first feature detection algorithm;
retrieving, from one or more memories, data containing (a) a preceding pose of the object, (b) preceding image first features detected in a preceding image frame prior to the image frame and corresponding to the preceding pose of the object, and (c) first 3D points corresponding to the preceding image first features;
matching the image first features and the preceding image first features to establish first correspondences between the image first features and the first 3D points;
deriving a candidate pose of the object corresponding to the image frame based on the preceding pose of the object and the first correspondences;
deriving (a) candidate pose second features using the candidate pose and (b) second 3D points corresponding to the candidate pose second features;
detecting, from the image frame, image second features using a second feature detection algorithm;
matching the image second features and the candidate pose second features to establish second correspondences between the image second features and the second 3D points; and
deriving a pose of the object in the image frame based on (a) the candidate pose, (b) the first correspondences, and (c) the second correspondences.

9. The method of claim 8, wherein detecting first image features by a first feature detection algorithm comprises detecting corners of a representation of the object in the image frame using a corner detection algorithm.

10. The method of claim 9, wherein detecting second image features by a second feature detection algorithm comprises detecting a plurality of contour points of the representation of the object using an edge detection algorithm.

11. The method of claim 8, further comprising:
retrieving, from one or more memories, keyframe data containing (a) keyframe first features detected in a keyframe image frame prior to the image frame and corresponding to the keyframe pose of the object and (b) keyframe 3D points corresponding to the keyframe first features; and
matching the image first features and the keyframe first features to establish keyframe correspondences between the image first features and the keyframe 3D points, wherein deriving a candidate pose of the object corresponding to the image frame based on the preceding pose of the object and the first correspondences comprises deriving a candidate pose of the object corresponding to the image frame based on the preceding pose of the object, the first correspondences, and the keyframe correspondences.

12. The method of claim 11, further comprising:
selectively updating the keyframe data based on the detected image first features and candidate pose.

13. The method of claim 8, further comprising:
performing a hybrid refinement M times after deriving the pose of the object in the image frame, where M is an integer equal to or greater than 1, the hybrid refinement comprising:
deriving (a) second features using an N−1th pose and (b) second 3D points corresponding to the N−1th pose second features, where N is an integer value of a current performance of the hybrid refinement and the 0th pose is the pose;
detecting, from the image frame, image second features using the second feature detection algorithm;
matching the image second features and the N−1th pose second features to establish N−1th pose second correspondences between the image second features and the N−1th pose second 3D points; and
deriving an Nth pose of the object in the image frame based on (a) the candidate pose, (b) the first correspondences, and (c) the N−1th pose second correspondences.

14. The method of claim 13, wherein M is three, and further comprising:
selecting the $3^{rd}$ pose of the object in the image frame as a final pose of the object in the image frame.

15. A head-mounted display device comprising:
a camera;
one or more memories;
a display device; and
a processor configured by instructions stored in the one or more memories to perform a method comprising:
acquiring, from the camera, an image frame representing an object in a real scene;
detecting, from the image frame, image first features using a first feature detection algorithm;
retrieving, from the one or more memories, data containing (a) a preceding pose of the object, (b) preceding image first features detected in a preceding image frame prior to the image frame and corresponding to the preceding pose of the object, and (c) first 3D points corresponding to the preceding image first features;

matching the image first features and the preceding image first features to establish first correspondences between the image first features and the first 3D points;

deriving a candidate pose of the object corresponding to the image frame based on the preceding pose of the object and the first correspondences;

deriving (a) candidate pose second features using the candidate pose and (b) second 3D points corresponding to the candidate pose second features;

detecting, from the image frame, image second features using a second feature detection algorithm;

matching the image second features and the candidate pose second features to establish second correspondences between the image second features and the second 3D points;

deriving a pose of the object in the image frame based on (a) the candidate pose, (b) the first correspondences, and (c) the second correspondences; and display, with the display device, a display image, at least one of the position at which the display image is displayed and the content of the display image being based at least in part on the derived pose of the object.

16. The head-mounted display device of claim 15, wherein detecting first image features by a first feature detection algorithm comprises detecting corners of a representation of the object in the image frame using a corner detection algorithm.

17. The head-mounted display device of claim 16, wherein detecting second image features by a second feature detection algorithm comprises detecting a plurality of contour points of the representation of the object using an edge detection algorithm.

18. The head-mounted display device of claim 15, wherein the method performed by the processor further comprises:

retrieving, from the one or more memories, keyframe data containing (a) keyframe first features detected in a keyframe image frame prior to the image frame and corresponding to the keyframe pose of the object and (b) keyframe 3D points corresponding to the keyframe first features; and matching the image first features and the keyframe first features to establish keyframe correspondences between the image first features and the keyframe 3D points, wherein deriving a candidate pose of the object corresponding to the image frame based on the preceding pose of the object and the first correspondences comprises deriving a candidate pose of the object corresponding to the image frame based on the preceding pose of the object, the first correspondences, and the keyframe correspondences.

19. The head-mounted display device of claim 18, wherein the method performed by the processor further comprises:

selectively updating the keyframe data based on the detected image first features and candidate pose.

20. The head-mounted display device of claim 15, wherein the method performed by the processor further comprises:

performing a hybrid refinement M times after deriving the pose of the object in the image frame, where M is an integer equal to or greater than 1, the hybrid refinement comprising:

deriving (a) second features using an N−1th pose and (b) second 3D points corresponding to the N−1th pose second features, where N is an integer value of a current performance of the hybrid refinement and the 0th pose is the pose;

detecting, from the image frame, image second features using the second feature detection algorithm;

matching the image second features and the N−1th pose second features to establish N−1th pose second correspondences between the image second features and the N−1th pose second 3D points; and deriving an Nth pose of the object in the image frame based on (a) the candidate pose, (b) the first correspondences, and (c) the N−1th pose second correspondences.

* * * * *